United States Patent
Miyake

(10) Patent No.: US 7,164,632 B2
(45) Date of Patent: Jan. 16, 2007

(54) OPTICAL PICKUP TRACKING ERROR DETECTING METHOD AND OPTICAL PICKUP DEVICE

(75) Inventor: Takahiro Miyake, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 287 days.

(21) Appl. No.: 10/491,546

(22) PCT Filed: Oct. 4, 2002

(86) PCT No.: PCT/JP02/10346

§ 371 (c)(1),
(2), (4) Date: Apr. 2, 2004

(87) PCT Pub. No.: WO03/036630

PCT Pub. Date: May 1, 2003

(65) Prior Publication Data

US 2005/0018561 A1 Jan. 27, 2005

(51) Int. Cl.
G11B 7/00 (2006.01)

(52) U.S. Cl. .............. 369/44.41; 369/112.01; 369/110.03

(58) Field of Classification Search ............ 369/44.41, 369/44.42, 112.01, 112.1, 110.02, 110.03, 369/110.04, 112.15, 112.16, 116, 44.26, 44.27, 369/44.28

See application file for complete search history.

(56) References Cited

U.S. PATENT DOCUMENTS 6,169,714 B1 1/2001 Tanaka et al.
6,185,167 B1 2/2001 Arai et al. ............... 369/44.23
6,567,353 B1 * 5/2003 Kubo et al. .............. 369/44.23
6,636,464 B1 10/2003 Lee et al.
6,822,934 B1 * 11/2004 Nishiwaki et al. ........ 369/44.23

FOREIGN PATENT DOCUMENTS

| CN | 1215207 | 4/1999 |
|----|---------|--------|
| CN | 1278096 | 12/2000 |
| JP | 61-94246 | 5/1986 |
| JP | 11-73658 | 3/1999 |
| JP | 2001-209964 | 8/2001 |

OTHER PUBLICATIONS

English Translation of PCT International Preliminary Examination Report, dated Sep. 10, 2003 (4 pgs.) for corresponding application No. PCT/JP02/10346.

* cited by examiner

*Primary Examiner*—Nabil Hindi
(74) *Attorney, Agent, or Firm*—David G. Conlin; Steven M. Jensen; Edwards Angell Palmer & Dodge LLP

(57) ABSTRACT

Part of reflected light from an optical disc enters a diffraction element (10). The ±first-order diffracted light and zero-order diffracted light from the diffraction device (10) travel via a cylindrical lens (11) and a spot lens (12) and enter a photodetector (13). If an objective lens shifts, a beam on the diffraction element (10) also shifts. Therefore, the intensity distribution of a spot of the zero-order diffracted light falling on light-receiving areas (A, B, C, D) of a four-part light-receiving element (13a) becomes bright as a whole, while the intensity distributions of spots of the ±first-order diffracted light falling on light-receiving areas (E, F) of light-receiving elements (13b, 13c) become dark as a whole. Thus, an optical pickup tracking error detecting method and an optical pickup device enabling good tracking control are provided.

44 Claims, 23 Drawing Sheets

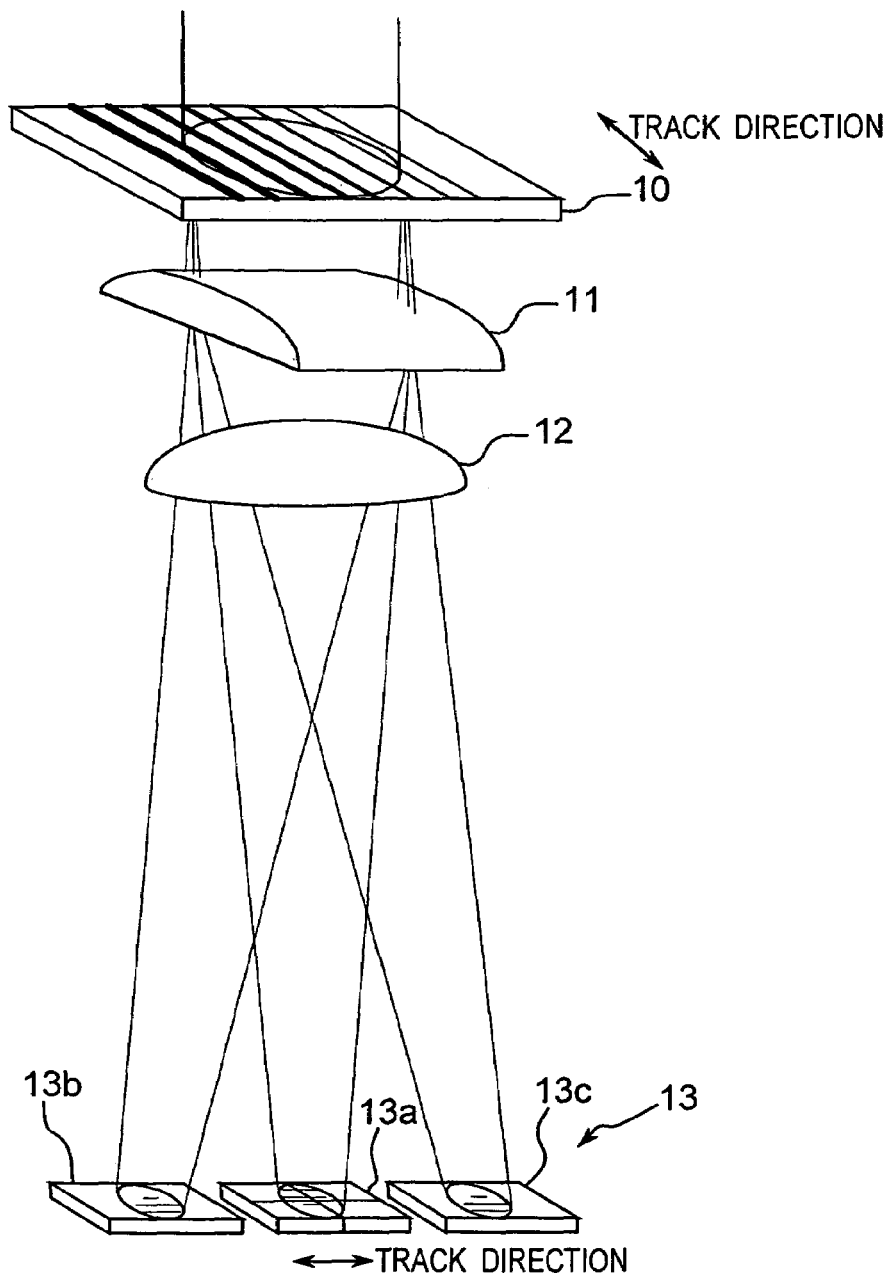
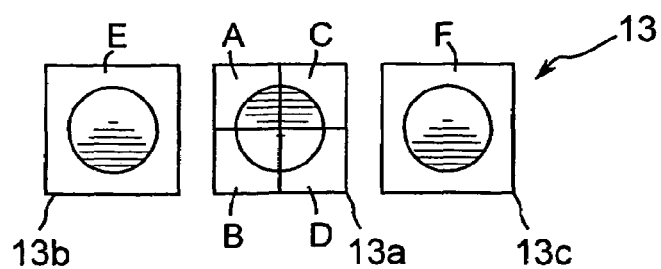

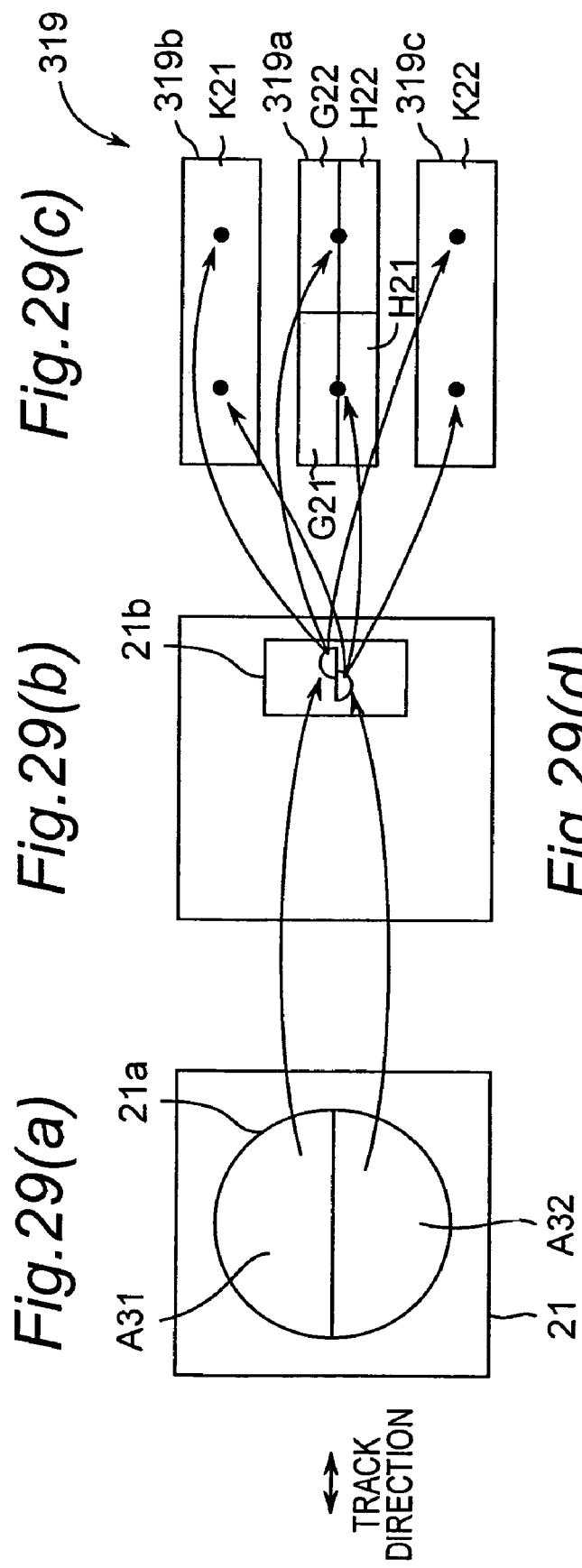
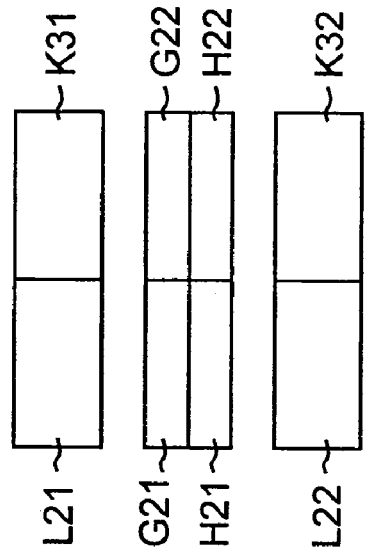

OPTICAL PICKUP TRACKING ERROR DETECTING METHOD AND OPTICAL PICKUP DEVICE

This application is the U.S. national phase of International Application PCT/JP02/10346 filed Oct. 4, 2002, which designated the United States. PCT/JP02/10346 claims priority to Japan Patent Application No. 2001-308590 filed Oct. 4, 2001. The entire contents of these applications are incorporated herein by reference.

TECHNICAL FIELD

The present invention relates to a method of detecting a tracking error of an optical pickup which is used in an optical reproducing apparatus for reproducing information from a reproduction-only optical disk such as a compact disk and a laser disk, or in an optical recording and reproducing apparatus for recording information on a recordable or rewritable optical disk and reproducing information therefrom, and it also relates to an optical pickup device.

BACKGROUND ART

Optical pickup devices adopting a three-beam method or a push pull method as a tracking servo method are known.

As shown in FIG. 32, in the three-beam method, a main beam S1 is converged on the surface of an optical disk, and sub-beams S2, S3 are converged at both sides of the main beam S1. Reflected light from the disk of the sub-beam S2 and that of the sub-beam S3 are detected by photodetectors D1, D2 respectively. A differential signal D1–D2 between both reflected light is taken as a tracking signal.

In the push pull method, as shown in FIGS. 33(a) and (b), beams L emitted from a laser 31 are converged on the surface of an optical disk 35 by an objective lens 34. Beams reflected from the optical disk 35 are guided to a two-part photodetector 36 by a polarization beam splitter 33. At this time, a differential signal D1'–D2' of signals from light-receiving regions D', D2' of the two-part photodetector 36 is taken as a tracking signal.

In the three-beam method, the interval between the sub-beams S2 and S3 to generate the tracking signal is very large. Therefore in the case where tracking is performed from an information-unrecorded portion of the optical disk to an information-recorded portion thereof, as shown in FIG. 32, there is a big difference between the reflected light of the sub-beam S2 and that of the sub-beam S3. Thus the three-beam method has a problem that a tracking offset is generated in the differential signal D1–D2 of the photodetectors D1, D2 owing to the influence of the difference between the amount of the reflected light of the sub-beam S2 and that of the reflected light of the sub-beam S3 other than a tracking deviation signal.

At the stage of assembling the pickup adopting the three-beam method, it is necessary to accurately make a positional adjustment so that each of the sub-beams S2 and S3 is applied to a predetermined track. Thus three-beam method has a problem that it takes long to assemble the pickup.

In the three-beam method, because three beams are generated from one light source, it is necessary to make the output of the light source large to secure the amount of the main beam which is used to record and reproduce information. Thus the three-beam method has a problem that the light source has a large burden so that the power consumption increases.

The problems which arise in the three-beam method would not occur in the push pull method in principle, but the push pull method has the following problem.

In the push pull method, the difference in the amount of the light reflected from the optical disk 35 between the right side and the left side of the light amount distribution is detected to obtain the tracking signal. If the objective lens moves in a radial direction in this tracking, there may occur a deviation in the optical axis of the light reflected from the optical disk 35, as shown in FIG. 33(a). Therefore the beam center may deviate from the center of the two-part photodetector 36.

When the optical disk 35 has a tilt, as shown in FIG. 33(b), the light reflected from the optical disk 35 returns to the objective lens 34 with the reflected light tilting relative to the objective lens. Therefore the center of the reflected light deviates from the objective lens 34.

As described above, although the tracking itself is correct in both cases, an offset is generated in the differential signal D1'–D2' of the signals from the light-receiving regions D1', D2' of the two-part photodetector 36. Therefore tracking cannot be performed favorably.

DISCLOSURE OF THE INVENTION

Therefore, it is an object of the present invention to provide a tracking error detection method, of an optical pickup, capable of accomplishing a preferable tracking control and an optical pickup device.

To solve the problems, in a method of detecting a tracking error of an optical pickup in which light of a light source is converged on a surface of an optical disk by means of an objective lens and light reflected from the optical disk is used to detect a tracking error signal, according to the present invention, the method includes the steps of:

making the light reflected from the optical disk enter a first light-receiving element and a second light-receiving element in such a manner that an amount of light entering the first light-receiving element is increased and an amount of light entering the second light-receiving element is decreased in accordance with a shift of the objective lens in a specified disk radial direction by a light-amount distribution means; and obtaining a tracking error signal by correcting a push-pull signal, based on a differential signal between an output signal of the first light-receiving element and an output signal of the second light-receiving element.

According to the tracking error detection method having the above-described construction, in accordance with the shift of the objective lens in the specified disk radial direction, the light-amount distribution means increases the amount of the light incident on the first light-receiving element and decreases the amount of the light incident on the second light-receiving element. Thereby the differential signal between the output signal of the first light-receiving element and the output signal of the second light-receiving element is changed according to the shift direction and shift amount of the objective lens. Therefore, it is possible to obtain the tracking error signal by correcting the push-pull signal based on the differential signal between the output signal of the first light-receiving element and the output signal of the second light-receiving element. Thus, good tracking control is achievable.

Further, in a method of detecting a tracking error of an optical pickup in which light of a light source is converged on a surface of an optical disk by means of an objective lens and light reflected from the optical disk is used to detect a tracking error signal, according to the present invention, the method includes the steps of:

making the light reflected from the optical disk enter a first light-receiving element for generating a push-pull signal and a second light-receiving element for generating a correction signal in such a manner that an amount of light entering the first light-receiving element is increased and an amount of light entering the second light-receiving element is decreased in accordance with a shift of the objective lens in a specified disk radial direction by a light-amount distribution means; and detecting a tracking error signal by subtracting from the push-pull signal a differential signal between an output signal of the first light-receiving element and an output signal of the second light-receiving element.

In one embodiment, the first light-receiving element is a light-receiving element for generating the push-pull signal, and the second light-receiving element is a light-receiving element for generating a correction signal. And, in the step of obtaining a tracking error signal, the tracking error signal is detected by subtracting a signal of a differential output between the first light-receiving element and the light-receiving element from the push-pull signal.

According to the above-described construction, it is possible to generate the tracking error signal unsusceptible to the shift of the objective lens. Therefore a good tracking control is executed.

The term "optical disk" herein means a pit disk, a phase change disk, a magneto-optical disk, and so on.

In one embodiment, the first light-receiving element is a two-part light-receiving element divided by a parting line in a track direction.

In one embodiment, the first light-receiving element is a four-part light-receiving element divided by a parting line in a track direction and also divided by a parting line in a radial direction.

In one embodiment, the second light-receiving element is a two-part light-receiving element divided by a parting line in a track direction.

In one embodiment, the second light-receiving element is a four-part light-receiving element divided by a parting line in a track direction and also divided by a parting line in a radial direction.

Also, an optical pickup device according to the present invention includes:

a converging optical system including an objective lens converging light of a light source on a surface of an optical disk;

a first light-receiving element and a second light-receiving element; and a signal-generating optical system guiding light reflected from the optical disk to the first light-receiving element and the second light-receiving element, the signal-generating optical system having a light-amount distribution means distributing an amount of the light reflected from the optical disk to the first light-receiving element and the second light-receiving element such that an amount of light entering the first light-receiving element is increased and an amount of light entering the second light-receiving element is decreased in accordance with a shift of the objective lens in a specified disk radial direction, wherein a push-pull signal is corrected based on a differential signal between an output signal of the first light-receiving element and an output signal of the second light-receiving element.

According to the optical pickup device having the above-described construction, the light-amount distribution means distributes the amount of light reflected from the optical disk to the first light-receiving element and the second light-receiving element by increasing an amount of light incident on the first light-receiving element and decreasing an amount of light incident on the second light-receiving element in accordance with the shift of the objective lens in a specified disk radial direction. Thus the differential signal between the output signal of the first light-receiving element and the output signal of the second light-receiving element is changed according to the shift direction and shift amount of the objective lens. Therefore it is possible to generate the tracking error signal by correcting the push-pull signal based on the differential signal between the output signal of the first light-receiving element and the output signal of the second light-receiving element. As a result, good tracking control is achievable. In other words, it is possible to construct an optical pickup device free from an offset in the tracking error signal irrespective of the shift of the objective lens.

In one embodiment, the first light-receiving element is a light-receiving element for generating the push-pull signal, and the second light-receiving element is a light-receiving element for generating a correction signal.

According to the optical pickup device having the above-described construction, in accordance with the shift of the objective lens in the specified disk radial direction, the light-amount distribution means increases the amount of the light incident on the first light-receiving element and decreases the amount of the light incident on the second light-receiving element. Thereby the differential signal between the output signal of the first light-receiving element and the output signal of the second light-receiving element is changed according to the shift direction and shift amount of the objective lens. Therefore, by subtracting the signal of the differential output between the output signal of the first light-receiving element and the output signal of the second light-receiving element from the push-pull signal, it is possible to obtain a tracking error signal unsusceptible to the shift of the objective lens. Thus, good tracking control is achievable. That is, it is possible to construct an optical pickup device free from an offset in the tracking error signal due to the shift of the objective lens.

Because the optical disk is irradiated with only one beam, it is possible to increase light-utilizing efficiency of the optical pickup and reduce a burden of the light source, for example, a laser.

Also, it is possible to form the push-pull signal with large amplitude. If push-pull signals are generated from light beams which have respective light amounts that change in utterly opposite directions, by using the first and second light-receiving elements, and those push-pull signals are combined, then influence of the change of the light amount is compensated. Consequently the generation of an initial offset of the push-pull signal is eliminated. Thus it is possible to reduce the number of portions to be adjusted in assembling the pickup.

It is also possible to form the tracking error signal with large amplitude. Therefore a good stable servo control is achievable.

Furthermore, an optical pickup device according to the present invention includes:

a converging optical system including an objective lens converging light of a light source on a surface of an optical disk;

a signal-generating optical system guiding light reflected from the optical disk to detect a tracking error signal;

a first light-receiving element for generating a push-pull signal; and a second light-receiving element for generating a correction signal, wherein in accordance with a shift of the objective lens in a specified disk radial direction, light incident on the first light-receiving element shifts so that a signal output of the first light-receiving element increases, while light incident on the second light-receiving element shifts so that a signal output of the second light-receiving element decreases.

According to the optical pickup device having the above-described construction, in accordance with the shift of the objective lens in the specified disk radial direction, the light-amount distribution means increases the amount of the light incident on the first light-receiving element and decreases the amount of the light incident on the second light-receiving element. Thereby the differential signal between the output signal of the first light-receiving element and the output signal of the second light-receiving element is changed according to the shift direction and shift amount of the objective lens. Therefore, by subtracting the signal of the differential output between the output signal of the first light-receiving element and the output signal of the second light-receiving element from the push-pull signal, it is possible to obtain a tracking error signal unsusceptible to the shift of the objective lens. Thus, good tracking control is achievable. That is, it is possible to construct an optical pickup device free from an offset in the tracking error signal due to the shift of the objective lens.

Because the optical disk is irradiated with only one beam, it is possible to increase light-utilizing efficiency of the optical pickup and reduce a burden of the light source, for example, a laser.

Also, it is possible to form the push-pull signal with large amplitude. If push-pull signals are generated from light beams which have respective light amounts that change in utterly opposite directions, by using the first and second light-receiving elements, and those push-pull signals are combined, then influence of the change of the light amount is compensated. Consequently the generation of an initial offset of the push-pull signal is eliminated. Thus it is possible to reduce the number of portions to be adjusted in assembling the pickup.

Further because it is unnecessary to use the light-amount distribution means, it is possible to reduce the number of optical component parts and hence the cost.

In one embodiment, the optical pickup device further includes:

a third light-receiving element for generating a signal of the optical disk;

a first polarization beam splitter splitting the light reflected from the optical disk into two beams; and a second polarization beam splitter splitting one of the two beams into a beam including the signal of the optical disk and a beam including the signal of the optical disk, guiding the beam including the signal to the third light-receiving element, and guiding the beam not including the signal to the first and second light-receiving elements via the light-amount distribution means.

The optical pickup device of this embodiment is capable of generating a servo signal free from an offset in the tracking signal.

In one embodiment, the light-amount distribution means comprises a diffraction grating element whose diffraction efficiency changes depending on an incidence position of incident light.

According to the optical pickup device of this embodiment, because the light-amount distribution means comprises a diffraction grating element, the light-amount distribution means can be formed on a thin substrate or on another optical element. Therefore it is easy to make the pickup compact.

In one embodiment, the diffraction grating element is divided into two regions by a parting line in a radial direction, and diffraction efficiencies of these two regions are opposite to each other in characteristics thereof along the parting line.

In the optical pickup device of this embodiment, the diffraction grating element is divided into two regions by the parting line in the radial direction, and the diffraction efficiencies of the two regions are opposite to each other in the characteristics thereof along the parting line. That is, in one of the two regions, the diffraction efficiency may become gradually lower in one direction. On the other hand, in the other of the two regions, the diffraction efficiency may become gradually higher in the one direction. Therefore it is possible to realize a diffraction grating element having a plurality of regions having different characteristics and thus construct a desired pickup with a minimum increase in the number of component parts.

In one embodiment, the diffraction grating element is a relief-type diffraction grating having ridge portions and groove portions, and diffraction efficiency of the diffraction grating element changes because a ratio between a ridge portion and a corresponding groove portion changes gradually from one end of the diffraction grating element toward the other end thereof.

According to the optical pickup device of this embodiment, because the relief-type diffraction element which can be mass-produced is adopted, it is possible to prevent an increase of the cost.

By controlling the ratio (DUTY) between the ridge portion and the groove portion, it is possible to form a diffraction element having few variations in its characteristics.

In one embodiment, the diffraction grating element is a relief-type diffraction grating having ridge portions and groove portions, and diffraction efficiency of the diffraction grating element changes because a depth of the groove portions changes gradually from one end of the diffraction grating element toward the other end thereof.

According to the optical pickup device of this embodiment, because the relief-type diffraction element which can be mass-produced is adopted, it is possible to prevent an increase of the cost.

By controlling the depth of the groove portion, it is possible to form a diffraction element having a high sensitivity.

In one embodiment, the light-amount distribution means comprises a filter whose transmittance changes with a gradient for light incident on the first and second light-receiving elements.

In the optical pickup device of this embodiment, because the light-amount distribution means comprises a filter whose transmittance changes with a gradient for light incident on the first and second light-receiving elements, it is possible to realize the light-amount distribution means having a higher sensitivity.

In one embodiment, the light-amount distribution means comprises a half mirror whose transmittance or reflectivity changes depending on an incidence position of incident light.

According to the optical pickup device of the above-described embodiment, because the light-amount distribution means comprises a half mirror, an optical component part for use in a conventional pickup can be used as the light-amount distribution means. Therefore it is possible to reduce the number of component parts and make the optical pickup device compact and at a reduced cost.

In one embodiment, the optical pickup device further includes:
 a polarization beam splitter splitting the light reflected from the optical disk into two beams and guiding one of the two beams to the second light-receiving element; and
 a light-branching element branching part of the other beam and guiding the branched part of light to the first light-receiving element,
 wherein a focus signal and a push-pull signal are generated by reception of the light at the first light-receiving element, and
 a signal of the optical disk is generated by reception of the light at the second light-receiving element.

The optical pickup device of this embodiment is capable of generating a servo signal free from an offset in the tracking signal.

Also, an optical element for use in the conventional pickups can be used as the light-amount distribution means as well. Therefore it is possible to reduce the number of component parts and hence reduce the size and cost of the optical pickup device.

In one embodiment, transmittance or reflectivity of the polarization beam splitter changes for a light component not including the signal of the optical disk depending on an incidence position of incident light.

In one embodiment, the light-branching element is a hologram element divided into two regions by a parting line in a radial direction and one of the two regions is further divided into two regions by a parting line in a track direction so that the hologram element has three regions in total.

In this optical pickup device, because the light-branching element is a hologram element having three regions, it is possible to generate a servo signal with the single light-branching element and light-receiving elements corresponding to the light-branching element, which allows the optical pickup device to be made compact.

In one embodiment, the first light-receiving element consists of a two-part light-receiving element divided by a parting line in a radial direction and two other light-receiving elements.

In one embodiment, a focus error signal is generated by reception of diffracted light from the other of the two regions of the light-branching element at a center of the two-part light-receiving element. And, a push-pull signal is generated by receiving diffracted light from each of two regions corresponding to two quarters of the light-branching element at each of the light-receiving elements.

In one embodiment, the two light-receiving elements are disposed to confront the diffracted lights from each of the two regions corresponding to the two quarters of the light-branching element.

In one embodiment, the optical pickup device further includes:
 a third light-receiving element for generating a signal of the optical disk;
 a polarization beam splitter splitting light reflected from the optical disk into two beams; and
 a light splitting means splitting one of the beams into a beam including the signal of the optical disk and a beam not including the signal.

This optical pickup device, which is intended for optical disks, is capable of generating a servo signal without generating an offset in the tracking signal.

Further it is possible to detect the servo signal and an MO (magneto-optical) signal in one optical system. Thus it is possible to make the optical pickup device compact.

In one embodiment, the optical pickup device further comprises:
 a third light-receiving element for generating a signal of the optical disk, and a light-receiving element for generating the push-pull signal;
 a polarization beam splitter splitting light reflected from the optical disk into a beam including the signal of the optical disk and a beam not including the signal and guiding the beam including the signal to the third light-receiving element and the light-receiving element for generating the push-pull signal; and
 a light-branching element branching part of the beam not including the signal and guiding the branched light to the first and second light-receiving elements.

This optical pickup device, which is intended for optical disks, is capable of generating a servo signal without generating an offset in the tracking signal.

According to this embodiment, because the signal-generating optical system for correcting the push-pull signal can be constructed simply, it is easy to manufacture the optical pickup device.

In one embodiment, the light-branching element is a diffraction grating element diffracting light in a track direction, and the light-amount distribution means comprises a diffraction grating element whose diffraction efficiency changes depending on an incidence position of incident light. Light diffracted by the diffraction grating element enters the diffraction grating element, and the correction signal is generated by receiving zero-order light and ±first-order light of the diffraction grating element at the first and second light-receiving elements.

According to the optical pickup device of this embodiment, because he light-branching element is a diffraction grating element diffracting light in a track direction and the light-amount distribution means comprises a diffraction grating element whose diffraction efficiency changes depending on an incidence position of incident light, it is possible to generate the correction signal, namely, a signal for correcting the push-pull signal, in a relatively simple construction.

In one embodiment, the optical pickup device further includes:
 a third light-receiving element for generating a signal of the optical disk;
 a polarization beam splitter splitting the light reflected from the optical disk into a beam including the signal of the optical disk and a beam not including the signal and guiding the beam including the signal to the third light-receiving element; and
 a light-branching element branching part of the light not including the signal and guiding the branched light to the first and second light-receiving elements, wherein a focus signal and the push-pull signal are generated by receiving the light at the first and second light-receiving elements.

This optical pickup device, which is intended for optical disks, is capable of generating a servo signal without generating an offset in the tracking signal.

Because an MO (magneto-optical) signal-generating optical system can be constructed simply, the optical pickup device can be manufactured easily.

In one embodiment, the light-branching element is a hologram element divided into two regions by a parting line in a radial direction and each of the two regions is further divided into two regions by a parting line in a track direction so that the hologram element has four regions in total; and diffraction efficiencies of the two regions are opposite to each other in characteristics thereof along the parting line in the radial direction.

In this optical pickup device, because the light-branching element is a hologram element having four regions, it is possible to generate a servo signal with the single light-branching element and light-receiving elements corresponding to the light-branching element, which in turn allows the optical pickup device to be made compact.

In one embodiment, the light-branching element is a hologram element divided into two regions by a parting line in a radial direction and one of the two regions is further divided into two regions by a parting line in a track direction so that the hologram element has three regions in total. And, diffraction efficiencies of the two regions are opposite to each other in characteristics thereof along the parting line in the radial direction.

In this optical pickup device, the light-branching element is a hologram element having three regions. Therefore it is possible to generate a servo signal with the single light-branching element and light-receiving elements corresponding to the light-branching element and thus make the optical pickup device compact.

Further because only a small number of light-receiving elements is required in correspondence to the number of regions of the light-branching element, the construction of the optical pickup device can be simplified.

In one embodiment, the light-amount distribution means is disposed between the light-branching element and the first and second light-receiving elements.

In this embodiment, when the light emitted by the light source travels to the optical disk through the light-branching element, the light-amount distribution means is capable of distributing the amount of the light to the light-branching element because the light-amount distribution means is disposed between the light-branching element not having a light-amount distribution function and the first and second light-receiving elements.

Since the light-branching element does not have a light-amount distribution function, the light-branching element does not change the intensity distribution of a luminous flux nor adversely affects a spot of light converged on the surface of the optical disk.

In one embodiment, the light-branching element is a hologram element divided into two regions by a parting line in a track direction, and a focus signal and the push-pull signal are generated by receiving diffracted light from the two regions at the first and second light-receiving elements. Further, the light-amount distribution means comprises a diffraction grating element whose diffraction efficiency changes depending on an incidence position of incident light, and the correction signal is generated by receiving ±first order light of the diffraction grating element at the second light-receiving element.

According to this embodiment, the light-amount distribution means is a diffraction grating element, and all of the zero-order light, and the ±first-order light of the diffraction grating element can be used to detect the servo signal. Therefore it is possible to generate a high-quality servo signal having little noise.

In one embodiment, the first polarization beam splitter or the polarization beam splitter is disposed between the light source and a collimating lens converting light of the light source into parallel light.

In the optical pickup device of this embodiment, it is possible to compactly design the first polarization beam splitter or the polarization beam, each of which is a main component part of the device, and the optical system disposed to rearward thereof for detecting the MO signal and the servo signal. Therefore it is possible to make the optical pickup device compact and lightweight.

In one embodiment, the optical disk is a pit disk.

Generally, when using mass-produced pit (ROM) disks that tend to eccentric and wobble to a considerable extent, the objective lens frequently shifts greatly when a servo control is executed. However, according to the optical pickup device of the above-described embodiment, even in such a case, the tracking offset is prevented from occurring and signals can be reproduced reliably.

In one embodiment, the optical disk is a phase change disk.

The pickup device is required to be adapted to the phase change disk that requires a high optical output power in a recording time. In spite of this, according to this embodiment, it is possible to realize an optical pickup of one beam scheme. Therefore it is possible to utilize light efficiently, reduce a burden of a laser serving as the light source, and reduce power consumption.

In one embodiment, the optical disk is a magneto-optical disk.

The pickup device is required to be adapted to the magneto-optical disk that requires a high optical output power in a recording time. In spite of this, according to this embodiment, it is possible to realize an optical pickup of one beam scheme. Therefore it is possible to utilize light efficiently, reduce a burden of a laser serving as the light source, and reduce power consumption.

In one embodiment, the light-amount distribution means and the light-branching element are formed on one substrate, with the light-amount distribution means formed on one surface of the substrate and with the light-branching element formed on the other surface thereof.

In this embodiment, because the light-amount distribution means and the light-branching element are formed on the same substrate, it is possible to reduce the number of component parts.

Also, because it is unnecessary to adjust the positional relationship between a front surface of the substrate and a rear surface thereof in assembling the pickup, it is possible to reduce an assembling time.

An optical disk apparatus according to the present invention has the above-described optical pickup device.

BRIEF DESCRIPTION OF THE DRAWINGS

FIGS. 2(a) and 2(b) are explanatory views of a servo signal detection optical system of the optical pickup device of the first embodiment.

FIGS. 29(a), 29(b), 29(c), and 29(d) are illustrations for explaining a servo signal detection optical system of the optical pickup device of the seventh embodiment.

BEST MODE FOR CARRYING OUT THE INVENTION

The embodiments of the optical pickup device of the present invention will be described in detail below with reference to the drawings.

(First Embodiment)

Figure 1:
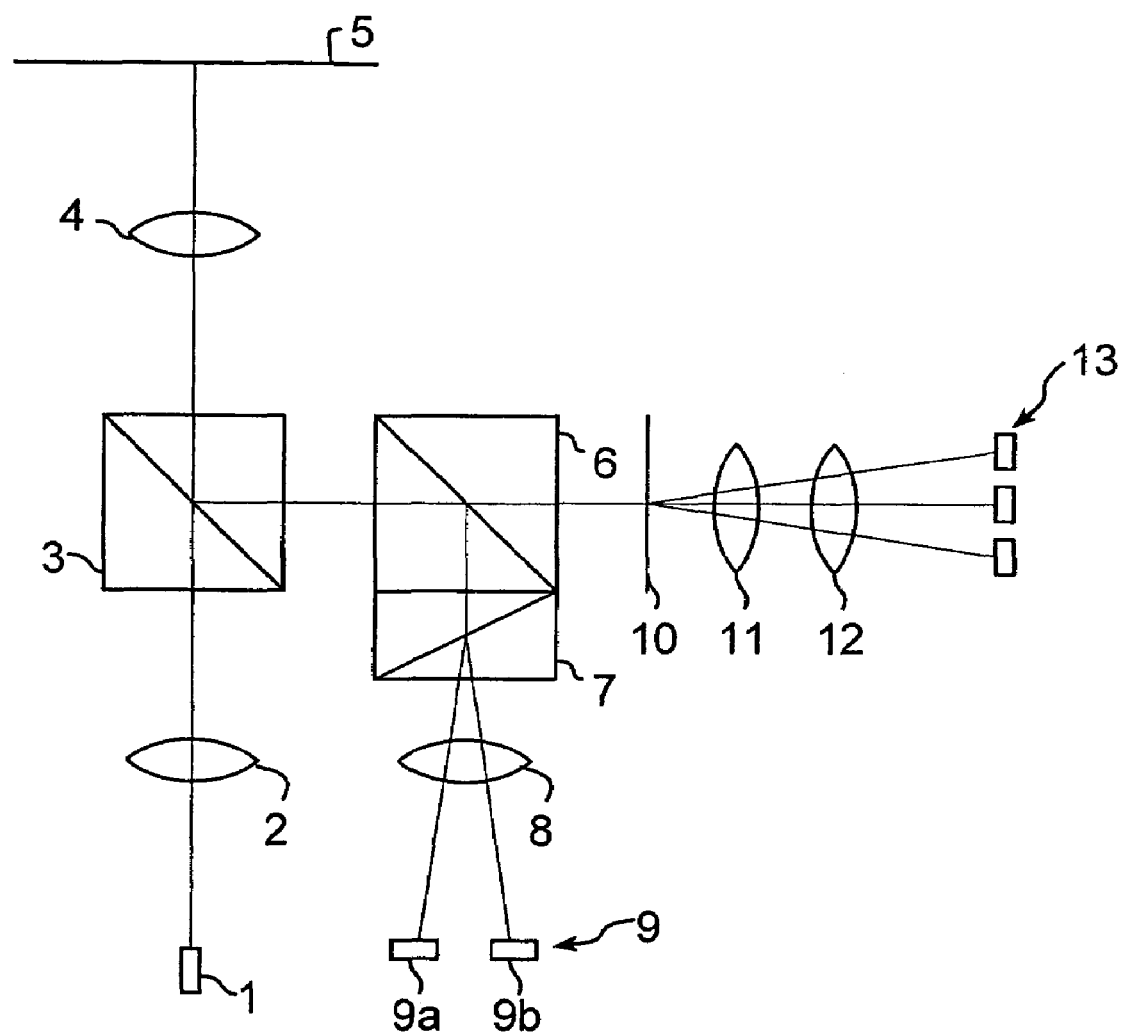
FIG. 1 is a schematic diagram of an optical pickup device of a first embodiment of the present invention.

FIG. 1 shows a schematic construction of an optical pickup device of a first embodiment of the present invention. The optical pickup device has a converging optical system for converging light of a semiconductor laser 1 onto a surface of an optical disk 5 by means of an objective lens 4, a signal-generating optical system for guiding light reflected from the optical disk 5 to detect a tracking error signal, and a photodetector 13 for generating a push-pull signal and a correction signal.

In the optical pickup device having the construction, after the light emitted from the semiconductor laser 1 is converted into parallel light by a collimating lens 2, it passes through a first polarization beam splitter 3, and forms a spot on the surface of the optical disk 5 by means of the objective lens 4. Thereafter the light reflected from the optical disk 5 becomes parallel light again, with a part of the parallel light reflected from the first polarization beam splitter 3.

Of the light reflected from the first polarization beam splitter 3, light including a magneto-optical signal component is further reflected from a second polarization beam splitter 6, and then split into two polarization components by Wollaston prism 7. Those two polarization components enter light-receiving elements 9a, 9b of a photodetector 9 via a spot lens 8. Thereby information recorded on the optical disk 5 is reproduced.

On the other hand, light which has not been reflected from the second polarization beam splitter 6 and has passed therethrough is diffracted by a diffraction element 10 serving as a light-amount distribution means. Thereafter ±first diffracted lights and zero-order diffracted light enter the photodetector 13 via a cylindrical lens 11 and a spot lens 12. Thereby a servo signal (focus error signal FES, tracking error signal TES) is detected.

FIG. 2(a) is an enlarged view showing a signal generation part provided in the optical system of the optical pickup device to detect the servo signal.

The method of generating the focus error signal FES will be described below with reference to FIG. 2(a).

The zero-order diffracted light is applied in the form of a beam spot having astigmatism to a four-part light-receiving element 13a serving as a first light-receiving element, via the cylindrical lens 11 and the spot lens 12.

As shown in FIG. 2(b), the four-part light-receiving element 13a has four light-receiving regions A, B, C, and D. Denoting outputs of these light-receiving regions A, B, C, and D as $O_A$, $O_B$, $O_C$, and $O_D$ respectively, the focus error signal FES can be generated by using an astigmatism method and performing a computation of equation (1) shown below:

$$FES=(O_A+O_D)-(O_B+O_C) \quad (1)$$

The generation principle of the tracking error signal TES will be described below.

From the spot of the zero-order diffracted light incident on each of the light-receiving regions A, B, C, and D of the four-part light-receiving element 13a from the optical system, the push-pull signal PP can be generated by performing a computation of equation (2) shown below:

$$PP=(O_A+O_C)-(O_B+O_D) \quad (2)$$

If the push-pull signal PP is the tracking error signal TES, then an offset will be generated owing to the OL (objective lens) shift, as described previously as a problem to be solved.

Thus an offset correction signal SHFT is generated by a method described below, and a TES signal that is not affected by the OL shift is generated by performing a computation of equation (3) shown below.

$$TES=PP-\gamma\times(SHFT) \quad (3)$$

The method of generating the offset correction signal SHFT will be described below.

In the optical system of FIG. 2(a), the diffraction element 10 has a characteristic that the diffraction efficiency changes gently according to the incidence position of light.

Figure 3:
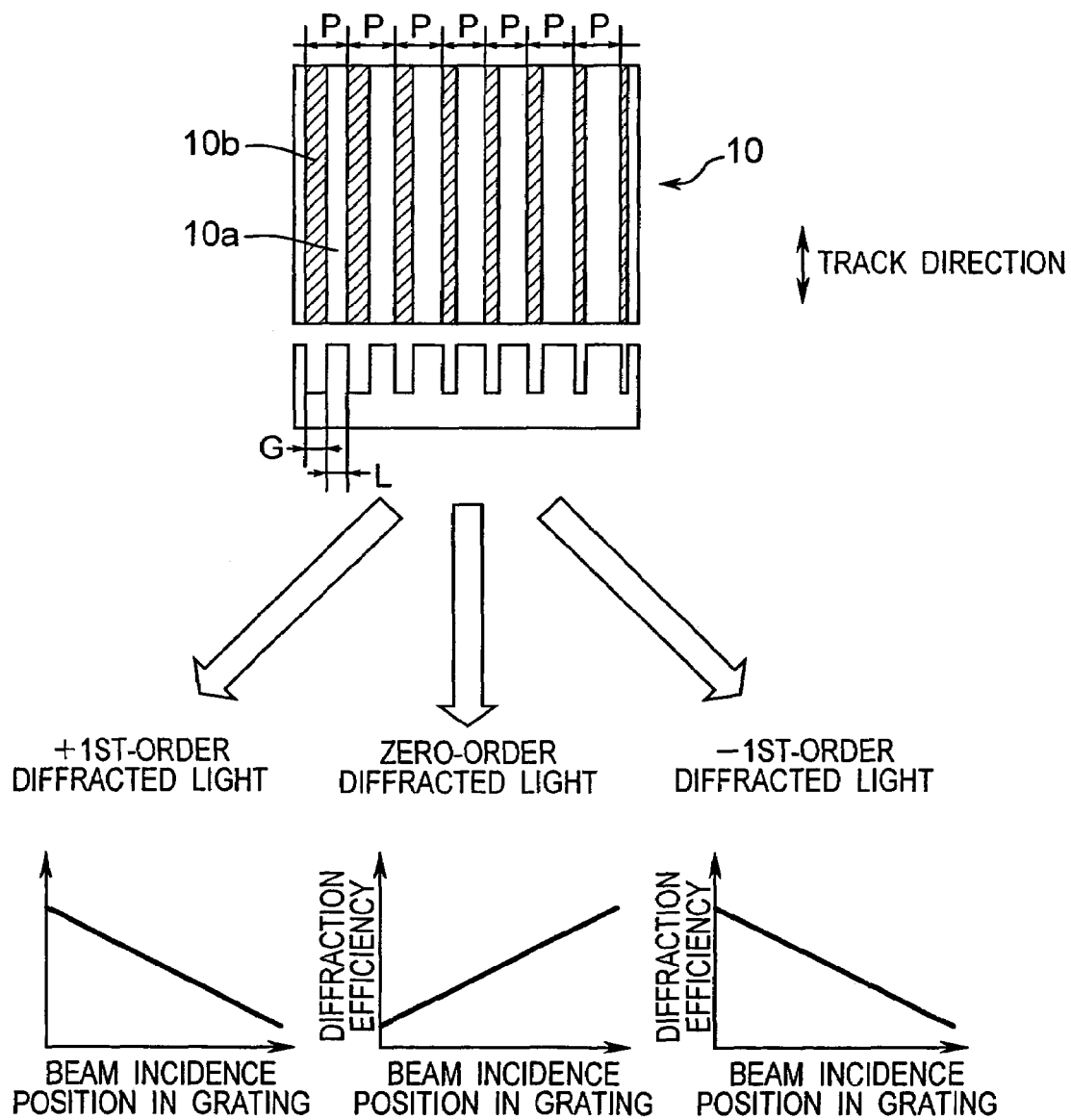
FIG. 3 explains a diffraction element of the optical pickup device of the first embodiment.

More specifically, as shown in FIG. 3, a grating pitch P is constant over the entire surface of the diffraction element 10. There is, however, a change in the ratio between a width L of a ridge portion 10a and a width G of a valley portion 10b. Defining the ratio of the valley portion 10b to the grating pitch P as a DUTY (=G/P), the DUTY changes linearly from the left end of the diffraction element 10 to the right end thereof in FIG. 3. Because the diffraction element 10 has the above construction, the ±first-order diffracted light of the light incident on the diffraction element 10 decreases gradually toward the right-hand end thereof. On the other hand, the zero-order diffracted light of the light incident on the diffraction element 10 increases gradually toward the right-hand end thereof.

Figure 4:
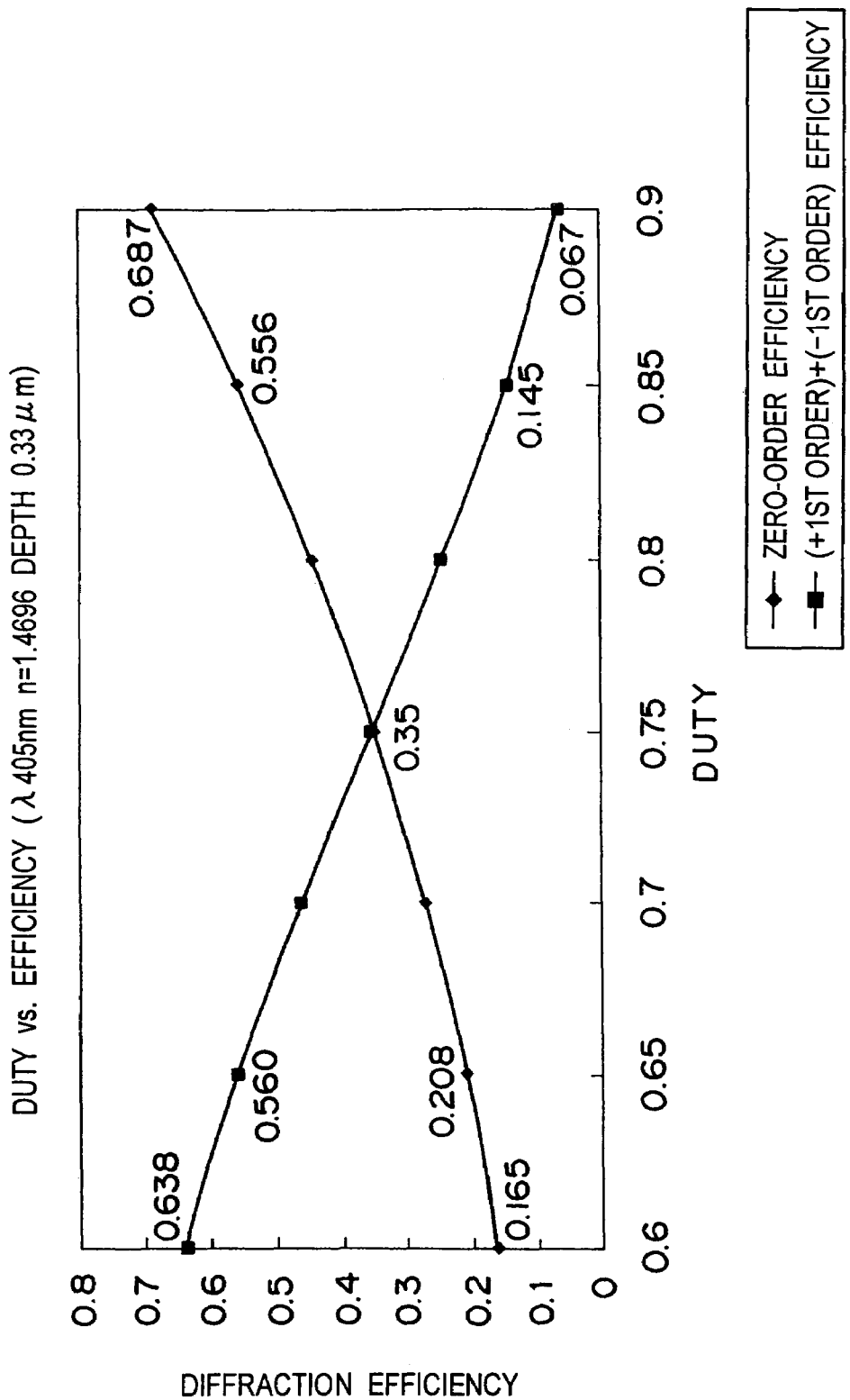
FIG. 4 is a graph showing a diffraction efficiency of the diffraction element.

For example, suppose that the wavelength of a light source is 405 nm, that the diffraction element 10 is a relief-type diffraction grating element using a quartz glass substrate, and that the depth of groove is 0.33 μm. As shown in FIG. 4, when there is a change in the DUTY from 0.6 to 0.85, the zero-order diffraction efficiency changes from 0.17 to 0.56 and the (+first-order)+(−first-order) diffraction efficiency changes from 0.64 to 0.15.

As another method of changing the diffraction efficiency, there is a method of gradually changing the groove depth. In this case, when the grooves have a depth corresponding to one wavelength of light, the ±first-order diffraction efficiency is maximum. When the groove has a depth larger or smaller than the depth corresponding to one wavelength of light, the diffraction efficiency becomes lower. Thus when grooves each having a depth falling within a range of less than one wavelength of light are formed, the diffraction element 10 may be constructed so that the grating pitch and the DUTY are constant all over the diffraction element and that the groove depth linearly changes so as to be gradually shallower from one end of the diffraction element to the other end thereof. Thereby the ±first-order diffracted light of the light incident on the diffraction element 10 decreases gradually from the one end toward the other end of the diffraction element 10. When grooves each having a depth falling within a range of more than one wavelength of light are formed, the diffraction element 10 is constructed so that the grating pitch and the DUTY are constant all over the diffraction element and that the groove depth linearly changes so as to be deeper from one end of the diffraction element to the other end thereof. Thereby the ±first-order diffracted light of the light incident on the diffraction element 10 decreases gradually from the one end toward the other end of the diffraction element 10.

As shown in FIG. 2(b), owing to the characteristic of the diffraction element 10, the spot of the zero-order diffracted light incident on the four-part light-receiving element 13a of the photodetector 13 has an intensity distribution that becomes gradually brighter toward the lower side of the four-part light-receiving element 13a as viewed in FIG. 2(b). On the other hand, a spot of the ±first-order diffracted light incident on the light-receiving regions E, F of light-receiving elements 13b, 13c, disposed at both sides of the four-part light-receiving element 13a, serving as second light-receiving elements has an intensity distribution that becomes gradually darker toward the lower side of the light-receiving regions E, F as viewed in FIG. 2(b). These distributions are generated because the image made by the diffraction element 10 is rotated by 90 degrees on a light-receiving surface owing to the operation of the cylindrical lens 11.

At this time, if the objective lens 4 shifts to the left-hand side in FIG. 1 so that the beam shifts on the diffraction element 10 to the right-hand side in FIG. 2(a), the beam spot shifts on the photodetector 13 toward the front side of the drawing sheet of FIG. 2(a). As a result, the intensity distribution of the spot of the zero-order diffracted light falling on the light-receiving regions A, B, C, and D of the four-part light-receiving element 13a is bright as a whole, whereas the intensity distributions of the spots of the ±first-order diffracted lights incident on the light-receiving regions E, F of the light-receiving elements 13b, 13c are dark as a whole. On the other hand, if the objective lens 4 shifts to the right-hand side in FIG. 1 so that beams shift on the diffraction element 10 to the left-hand side thereof in FIG. 2(a), the beam spot shifts on the photodetector 13 toward the rear side of the drawing sheet of FIG. 2(a). As a result, the intensity distribution of the spot of the zero-order diffracted light incident on the light-receiving regions A, B, C, and D of the four-part light-receiving element 13a is dark as a whole, whereas the intensity distribution of the spot of the ±first-order diffracted light incident on the light-receiving regions E, F of the light-receiving elements 13b, 13c is bright as a whole.

Therefore, if a gain a is adjusted such that, let outputs of the light-receiving regions E and F be $O_E$ and $O_F$, SHFT=$(O_A+O_C+O_B+O_D)-\alpha(O_E+O_F)$=0 in the state in which there is no OL shift, then:

SHFT>0 when there is an OL shift toward the left-hand side in FIG. 1, and

SHFT<0 when there is an OL shift toward the right-hand side in FIG. 1.

That is, the offset correction signal SHFT becomes an offset signal that changes according to the direction and amount of the OL shift.

An example of numerical values of the optical pickup device is shown below.

Semiconductor Laser
  Wavelength λ: 405 nm
  Laser radiation angle (half value, full angle):
    Radial direction: 10°
    Track direction: 25°

Collimating Lens
  Focal length: 12 mm, NA: 0.19
Objective Lens
  Focal length: 3.05 mm, NA: 0.65
Disk
  Track pitch: 0.74 μm (interval between lands)
  Groove depth: λ/7
  DUTY (land:groove): 1:1
Diffraction Element
  Zero-order diffraction efficiency: 35±15% (60 to 20%)
  (minus 1st-order)+(plus 1st-order) diffraction efficiency: 35±15% (20 to 60%)

Figure 5:
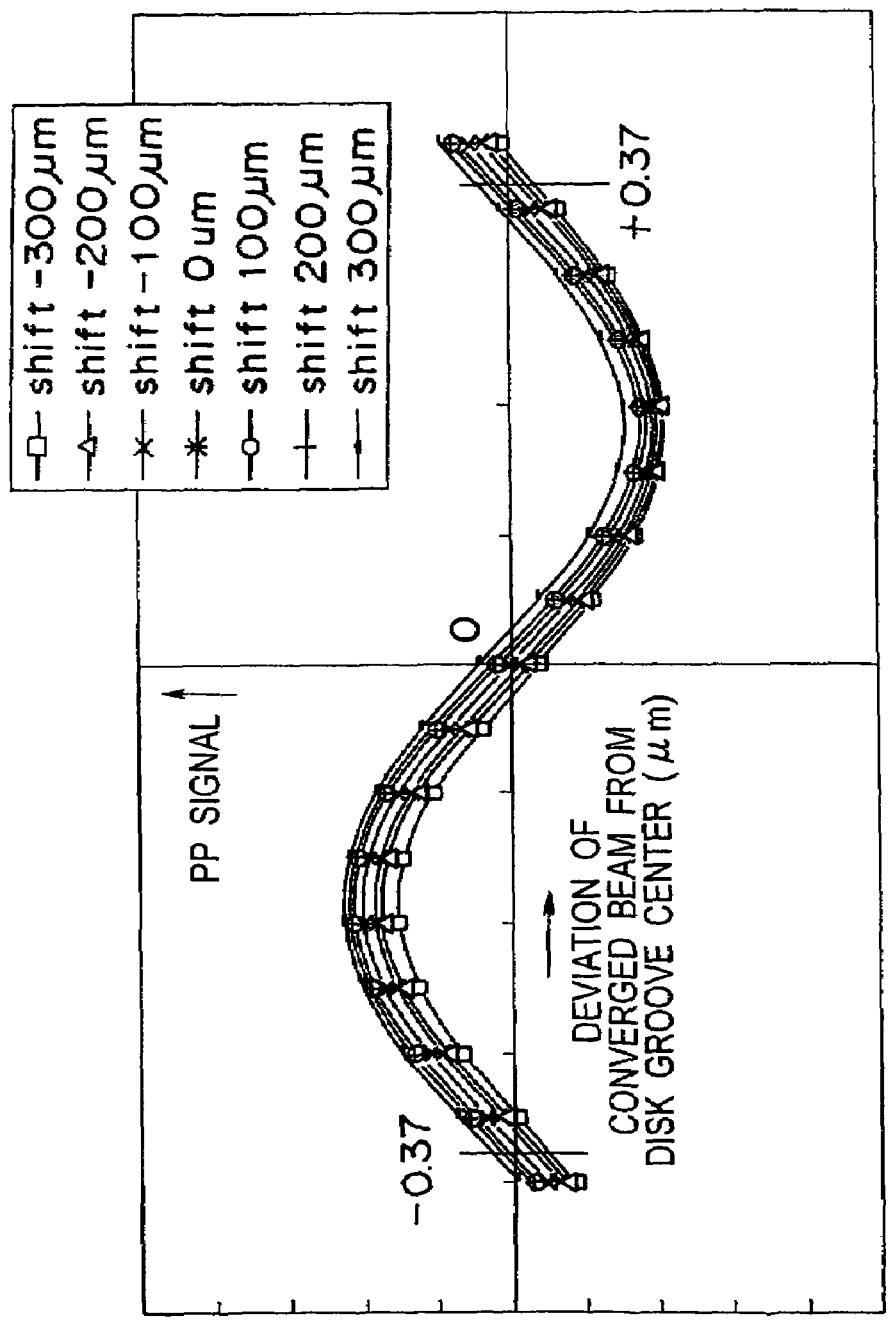
FIG. 5 is a graph showing a push-pull signal when an objective lens of the optical pickup device of the first embodiment shifts.
Figure 6:
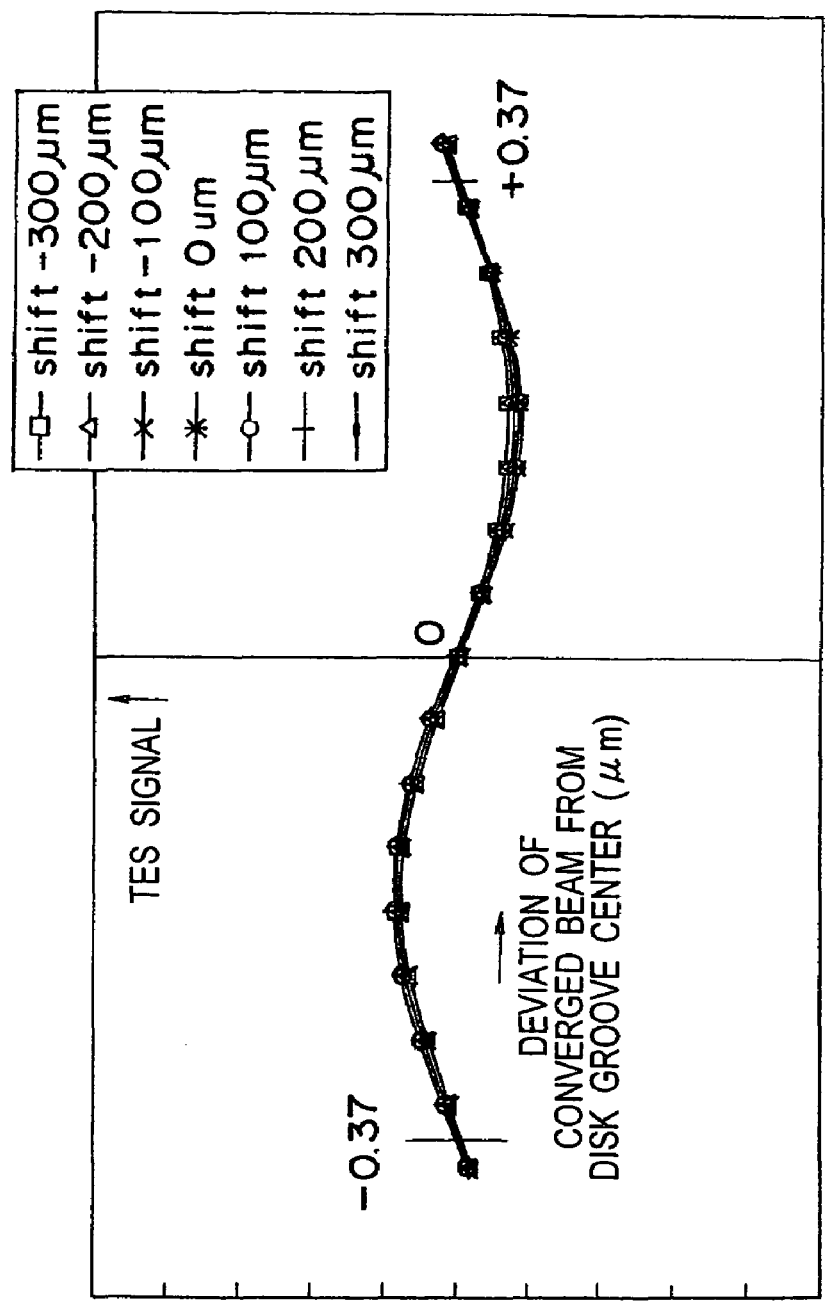
FIG. 6 is a graph showing a tracking error signal of the optical pickup device of the first embodiment.

In the optical pickup device having these specific numerical values, the push-pull signal PP and the tracking error signal TES at the time when the objective lens 4 is shifted by up to ±300 μm are shown in FIG. 5 and FIG. 6, respectively. In FIGS. 5 and 6, the abscissa axis indicates a beam-applied position of the disk, with the center of the groove on the disk plotted as 0.

As understood from FIGS. 5 and 6, the offset is generated in the push-pull signal owing to the OL shift, whereas the offset can be completely eliminated from the tracking error signal TES.

In the first embodiment, instead of using the second polarization beam splitter 6, it is possible to use a polarization beam splitter which reflects s-polarized light components entirely and which, regarding p-polarized light components, has transmission and reflection characteristics that its transmission efficiency or reflection efficiency changes gently according to the incidence position of light on the film. In this case, it is possible to change amounts of light on the four-part light-receiving element 13a and the light-receiving elements 13b, 13c without disposing the diffraction element 10 between the polarization beam splitter and the cylindrical lens 11.

When the polarization beam splitter is used, the focus error signal FES and the tracking error signal TES should be expressed as follows, supposing that the outputs of the light-receiving elements 9a, 9b for detecting an MO signal are $O_E$, $O_F$ respectively:

$$FES=(O_A+O_D)-(O_B+O_C)$$

$$TES=PP-\alpha\times(SHFT)$$

The push-pull signal PP and the offset correction signal SHFT are expressed as follows:

$$PP=(O_A+O_C)-(O_B+O_D)$$

$$SHFT=(O_A+O_B+O_C+O_D)-\beta(O_E+O_{F'})$$

The light-receiving elements 9a, 9b may be divided into two regions respectively by a parting line extending in a track direction. That is, instead of the light-receiving element 9a, a two-part light-receiving element having two light-receiving regions E1', E2' may be used, and instead of the light-receiving element 9b, a two-part light-receiving element having two light-receiving regions F1', F2' may be used. In this case, let the outputs of these light-receiving regions E1', E2', F1', and F2' be $O_{E1'}$, $O_{E2'}$, $O_{F1'}$, and $O_{F2'}$, the push-pull signal PP and the offset correction signal SHFT should be expressed as follows:

$$PP=\{(O_A+O_C)-(O_B+O_D)\}+\beta(O_{E1'}-O_{E2'})+(O_{F1'}-O_{F2'})\}$$

$$SHFT=(A+B+C+D)-\alpha(E1'+E2'+F1'+F2').$$

In this case, it is possible to obtain an effect of eliminating the generation of the initial offset of the push-pull signal PP and reducing the number of portions to be adjusted.

Figure 7:
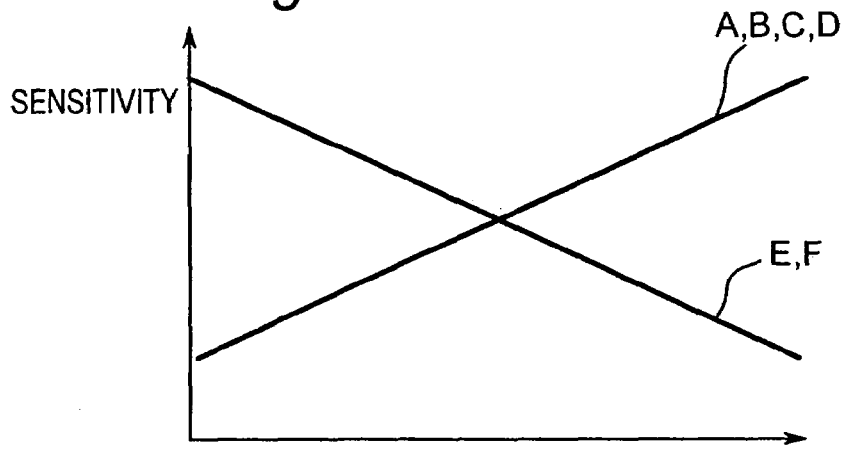
FIG. 7 is a graph showing the relationship between the sensitivity of a light-receiving element of the optical pickup device of the first embodiment and the position of a light-receiving surface of the light-receiving element.

The first embodiment is constructed such that depending on the position of the light incident on the diffraction element 10, there is a change in the amounts of light on the four-part light-receiving element 13a and the light-receiving elements 13b, 13c. However, the first embodiment may be constructed such that the transmission diffraction efficiency of the diffraction element 10 does not change (the grating DUTY and groove depth are constant all over the diffraction element) depending on the incidence position of light and that the light-receiving sensitivities of the four-part light-receiving element 13a and of the light-receiving elements 13b, 13c change depending on the incidence position of light thereon. For example, let it be supposed that the first embodiment has a construction that the light-receiving sensitivities of the light-receiving regions A, B, C, and D become gradually higher almost linearly toward the front side of the drawing sheet of FIG. 2 (downward in FIG. 2(b)) and that the light-receiving sensitivities of the light-receiving regions E, F become gradually lower almost linearly toward the front side of the drawing sheet of FIG. 2 (downward in FIG. 2(b)), as shown in FIG. 7. In this construction, if the gain α is adjusted such that:
  $SHFT=(O_A+O_B+O_C+O_D)-\alpha(O_E+O_F)=0$ in the state where there is no OL shift, then
  SHFT>0 when there is an OL shift toward the left-hand side in FIG. 1, and
  SHFT<0 when there is an OL shift toward the right-hand side in FIG. 1.

Figure 8:
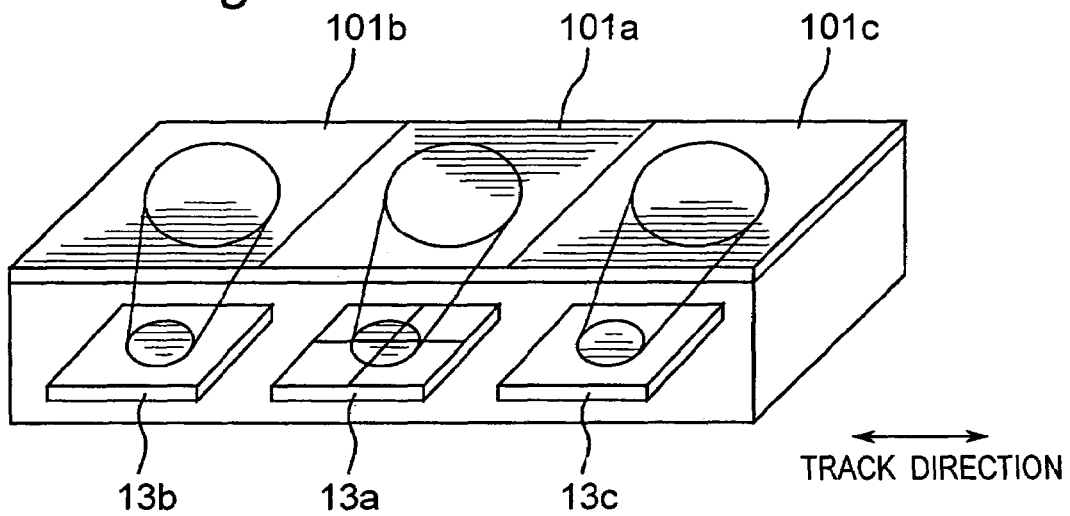
FIG. 8 shows a modification of the light-receiving element of the optical pickup device of the first embodiment.

Further, instead of changing the sensitivity of the light-receiving element, as shown in FIG. 8, filters 101a, 101b, and 101c whose transmittances change for light incident on the four-part light-receiving element 13a and the light-receiving elements 13b, 13c may be disposed over the four-part light-receiving element 13a and the light-receiving elements 13b, 13c. In this case, an effect similar to that of the first embodiment can be obtained.

In addition, an effect similar to that of the first embodiment can be obtained by disposing above the four-part light-receiving element 13a and the light-receiving elements 13b, 13c a diffraction element constructed such that the DUTY and the groove depth change linearly. That is, an effect similar to that of the first embodiment can be obtained by disposing the diffraction element having a characteristic that the diffraction efficiency changes gently according to the incidence position of light, above the four-part light-receiving element 13a and the light-receiving elements 13b, 13c.

Figure 9:
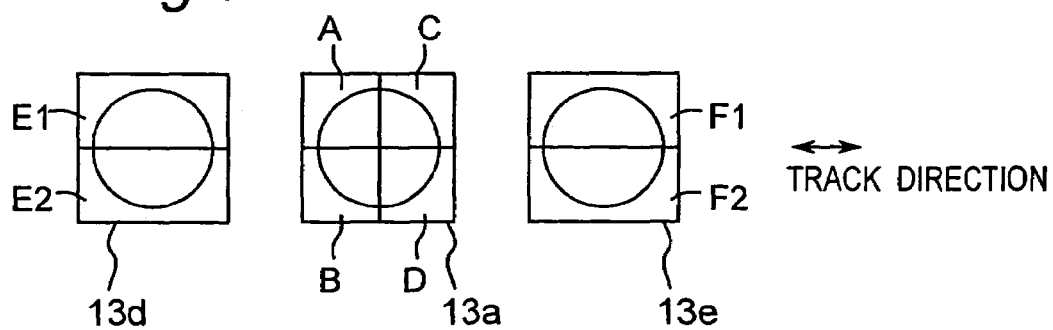
FIG. 9 shows a modification of the light-receiving element of the optical pickup device of the first embodiment.

Further as shown in FIG. 9, two-part light-receiving elements 13d, 13e may be used instead of the light-receiving elements 13b, 13c. The two-part light-receiving elements 13d, 13e have two light-receiving regions E1, E2 and F1, F2, respectively. In this case, supposing that outputs of the light-receiving regions E1, E2, F1, and F2 are $O_{E1}$, $O_{E2}$, $F_{F1}$, and $O_{F2}$, the push-pull signal PP and the offset correction signal SHFT should be expressed as follows:

$$PP=\{(O_A+O_C)-(O_B+O_D)\}+(O_{E1}-O_{E2})+(O_{F1}-O_{F2})$$

$$SHFT=(O_A+O_B+O_C+O_D)-\alpha(O_{E1}+O_{E2}+O_{F1}+O_{F2})$$

In this case, it is possible to obtain the effect of eliminating the generation of the initial offset of the push-pull signal PP and reducing the number of portions to be adjusted.

An example of numerical values of the optical pickup device is shown below.

Semiconductor Laser
  Wavelength λ: 405 nm
  Laser radiation angle (half value, full angle):
    Radial direction: 10°
    Track direction: 25°
Collimating Lens
  Focal length: 12 mm, NA: 0.19
Objective Lens
  Focal length: 3.05 mm, NA: 0.65
Disk
  Track pitch: 0.74 µm (interval between lands)
  Groove depth: λ/7
  DUTY (land:groove): 1:1
Diffraction Element
  Zero-order diffraction efficiency: 35+15% (60 to 20%)
  (minus 1st-order)+(plus 1st-order) diffraction efficiency: 35±15% (20 to 60%)

Figure 10:
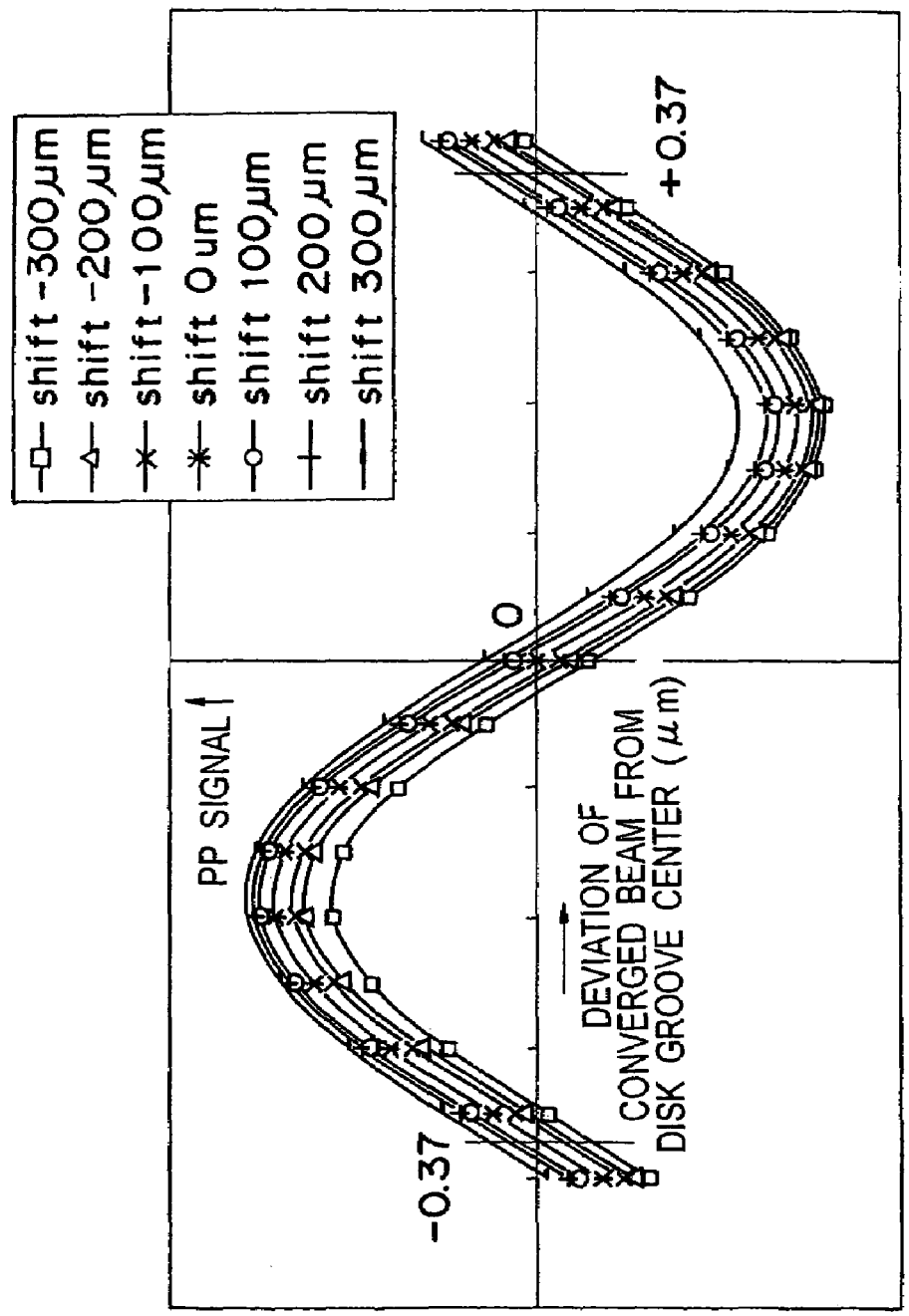
FIG. 10 is a graph showing a push-pull signal when an objective lens in an example of the optical pickup device of the first embodiment shifts.
Figure 11:
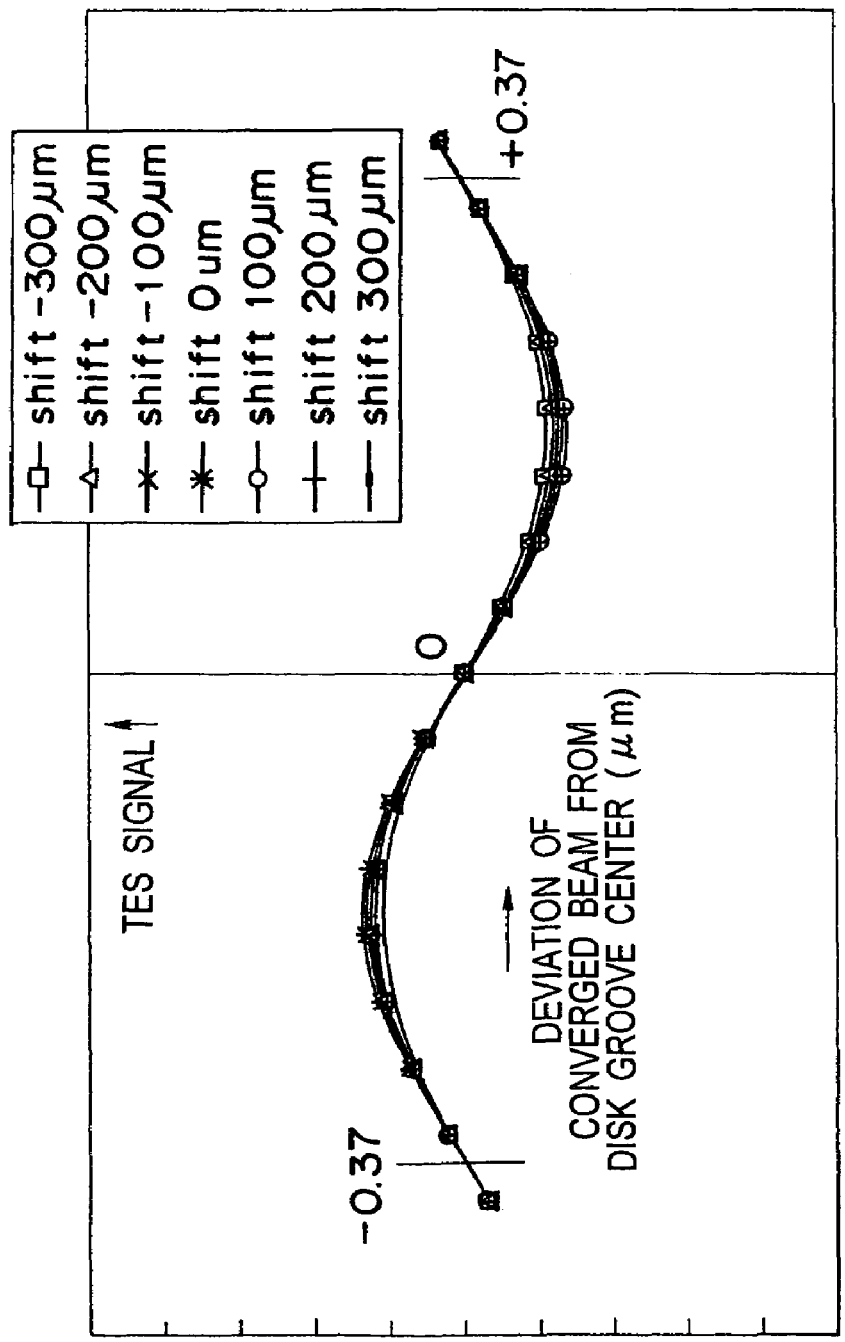
FIG. 11 is a graph showing a tracking error signal in an example of the optical pickup device of the first embodiment.

In the optical pickup device having these specific numerical values, the push-pull signal PP and the tracking error signal TES at the time when the objective lens 4 is shifted by up to ±300 µm are shown in FIG. 10 and FIG. 11, respectively. In FIGS. 10 and 11, the abscissa axis indicates a beam-applied position of the disk, with the center of the groove on the disk plotted as 0.

As understood from FIGS. 10 and 11, the offset is generated in the push-pull signal owing to the OL shift, whereas the offset can be completely eliminated from the tracking error signal TES. The amplitude of the tracking error signal TES in this case is larger than the case in which the light-receiving elements 13b, 13c are not divided into two parts.

Thereby a stable tracking servo can be realized.

(Second Embodiment)

Figure 12:
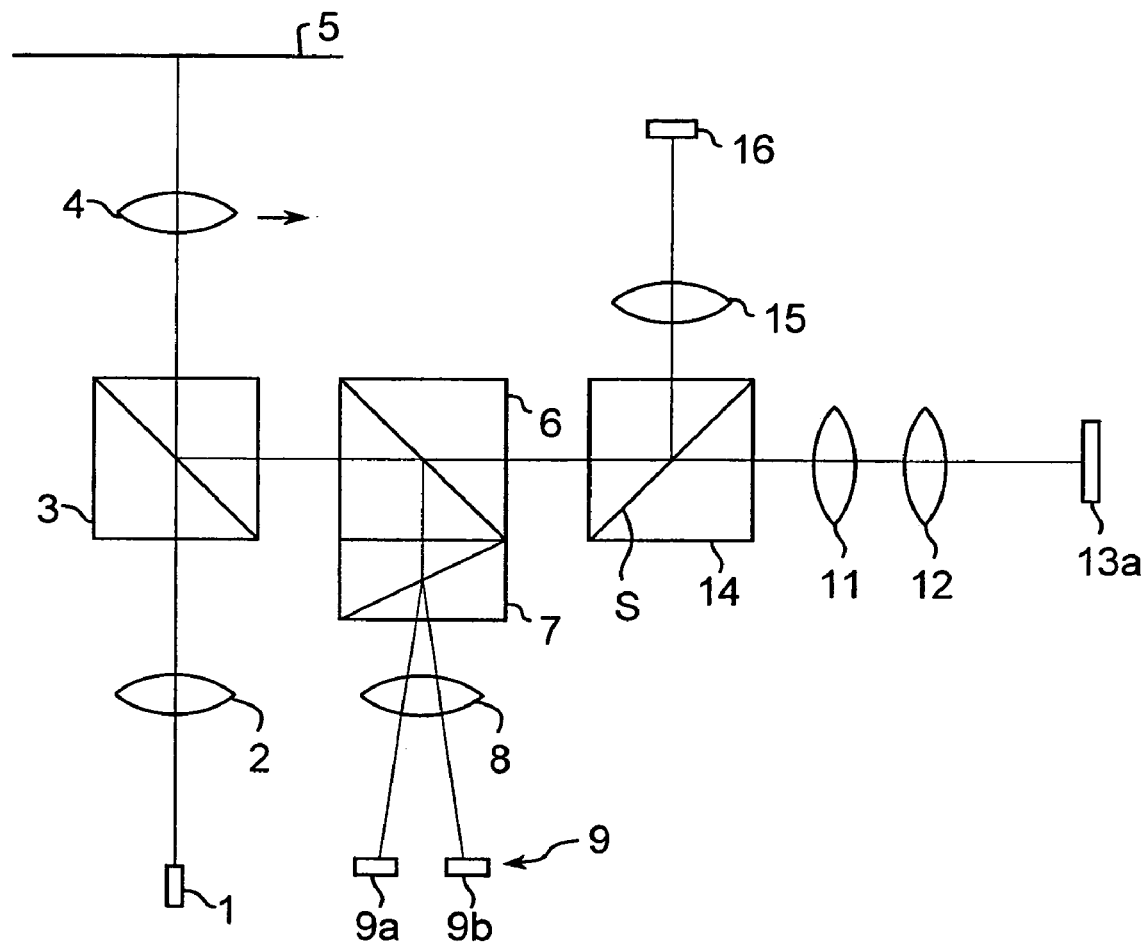
FIG. 12 is a schematic diagram of an optical pickup device of a second embodiment of the present invention.

FIG. 12 shows an optical pickup device of a second embodiment of the present invention. In the optical pickup device, after light emitted from the semiconductor laser 1 is converted into parallel light by the collimating lens 2, it passes through the first polarization beam splitter 3, and forms a spot on the surface of the optical disk 5 by the objective lens 4. Thereafter the light reflected from the optical disk 5 becomes parallel light again, with a part of the parallel light reflected from the first polarization beam splitter 3.

Of the light reflected from the first polarization beam splitter 3, light including a magneto-optical signal component is further reflected from a second polarization beam splitter 6, and then split into two polarization components by a Wollaston prism 7. Those two polarization components enter light-receiving elements 9a, 9b of a photodetector 9 via a spot lens 8. Thereby information recorded on the optical disk 5 is reproduced.

On the other hand, light which has not been reflected from the second polarization beam splitter 6 but has passed therethrough is split into transmitted light and reflected light by a third polarization beam splitter 14. The transmitted light enters the four-part light-receiving element 13a serving as the first light-receiving element, via a cylindrical lens 11 and a spot lens 12. The reflected light enters a light-receiving element 16 serving as the second light-receiving element via a spot lens 15. A servo signal (focus error signal FES, tracking error signal TES) is detected by the reception of the light by the four-part light-receiving element 13a and the light-receiving element 16.

The servo signal detection to be carried out in the optical system will be described below.

The light that has passed through the third polarization beam splitter 14 is sent to unshown light-receiving regions A, B, C, and D of the four-part light-receiving element 13a as a beam spot having astigmatism via the cylindrical lens 11 and the spot lens 12.

At this time, let outputs of the light-receiving regions A, B, C, and D be $O_A$, $O_B$, $O_C$, and $O_D$ respectively, the focus error signal FES can be generated by using the astigmatism method and performing a computation of equation (21) below:

$$FES=(O_A+O_D)-(O_B+O_C) \qquad (21)$$

The generation principle of the tracking error signal TES will be described below.

From the spot of the zero-order diffracted light incident on each of the light-receiving regions A, B, C, and D of the four-part light-receiving element 13a from the optical system, the push-pull signal PP can be generated by performing a computation of equation (22) shown below:

$$PP=(O_A+O_C)-(O_B+O_D) \qquad (22)$$

If the push-pull signal PP is the tracking error signal TES, then the offset will be generated owing to the OL shift, as described previously as a problem to be solved.

Thus an offset correction signal SHFT is generated by a method described below and then a TES signal not affected by the OL shift is generated by using an equation below:

$$TES=PP-\gamma \times (SHFT).$$

The method of generating the offset correction signal SHFT will be described below.

In the optical system of FIG. 12, the transmission/reflection characteristics of a film surface S of the third polarization beam splitter 14 is such that the transmission efficiency or the reflection efficiency changes gently according to the incident position of light.

More specifically, for example, the third polarization beam splitter 14 has a construction that the transmittance of the film surface S decreases linearly from its lower end to its upper end as viewed in FIG. 12. At this time, conversely, the reflectivity of the film surface S of the third polarization beam splitter 14 increases linearly. That is, the third polarization beam splitter 14 has a construction that the reflectivity of the film surface S thereof increases linearly from the lower side to the upper side in FIG. 12.

Because the film surface S of the third polarization beam splitter 14 has the above construction, the third polarization beam splitter 14 less transmits the incident light on the more right-hand side in FIG. 12, that is, transmitted light of the light incident on the third polarization beam splitter 14 decreases toward the upper side as viewed in FIG. 12. Conversely, reflected light of the light incident on the third polarization beam splitter 14 increases toward the upper side in FIG. 12. Thereby the spot light incident on the four-part light-receiving element 13a has an intensity distribution which becomes gradually brighter toward the lower side of the light-receiving element 13a as viewed in FIG. 12. The spot of the light incident on the light-receiving element 16 has an intensity distribution that becomes gradually darker toward the left-hand side of the light-receiving element 16 as viewed in FIG. 12.

When the objective lens 4 shifts to the right-hand side in FIG. 12, a beam spot shifts to the lower side in FIG. 12 on the film surface S of the third polarization beam splitter 14, and the intensity distribution of the spot of the light incident on the four-part light-receiving element 13a becomes bright as a whole, whereas the intensity distribution of the spot of the light incident on the light-receiving element 16 becomes dark as a whole. On the other hand, when the objective lens 4 shifts to the left-hand side in FIG. 12, the beam spot shifts to the upper side in FIG. 12 on the film surface S of the third polarization beam splitter 14, and the intensity distribution of the spot of the light incident on the four-part light-receiving element 13a becomes dark as a whole, whereas the intensity distribution of the spot of the light incident on the light-receiving element 16 becomes bright as a whole.

Therefore, if α gain a is adjusted such that, let an output of the light-receiving element 16 be $O_{E11}$, SHFT=$(O_A+O_B+O_C+O_D)-(O_{E11})$=0 in the state in which there is no OL shift, then:

SHFT>0 when there is an OL shift toward the right-hand side in FIG. 12, and

SHFT<0 when there is an OL shift toward the left-hand side in FIG. 12.

That is, the offset correction signal SHFT becomes an offset signal that changes according to the direction and amount of the OL shift.

The second embodiment is constructed so that depending on the position of incidence of the light on the third polarization beam splitter 14, the amount of light on the light-receiving element 16 and the four-part light-receiving element 13a changes. However, the second embodiment may be constructed such that the transmission/reflection efficiency of the third polarization beam splitter 14 does not change depending on the position of the light incident thereon and that the light-receiving sensitivities of the light-receiving element 16 and the four-part light-receiving element 13a change depending on the light incidence position. For example, suppose that the light-receiving sensitivity of the four-part light-receiving element 13a reduces almost linearly toward the upper side in FIG. 12 and that the light-receiving sensitivity of the light-receiving element 16 increases almost linearly toward the right-hand side in FIG. 12. In this construction, when a gain a is adjusted such that:

$$TES=PP-\alpha \times (SHFT) \text{ and}$$

$$SHFT=(O_A+O_B+O_C+O_D)-\alpha(O_{E11})=0 \text{ in the state where there is no OL shift, then:}$$

SHFT>0 when there is an OL shift toward the right-hand side in FIG. 12, and

SHFT<0 when there is an OL shift toward the left-hand side in FIG. 12.

Figure 13:
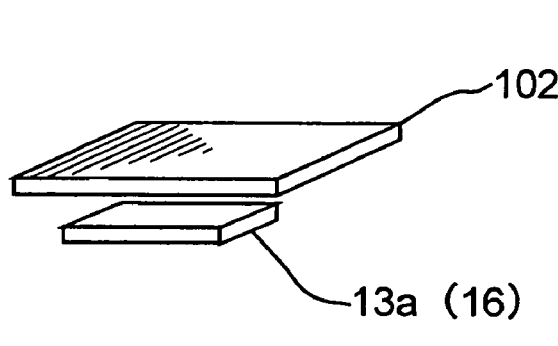
FIG. 13 shows a modification of a light-receiving element of the optical pickup device of the second embodiment.

Further, instead of changing the sensitivity of the light-receiving element, for example, as shown in FIG. 13, a filter 102 whose transmittance changes for light incident thereon or the diffraction element 10 may be installed above the four-part light-receiving element 13a and the light-receiving element 16. In this case, it is possible to obtain an effect similar to that obtained by changing the sensitivity of the light-receiving element.

Figure 14:
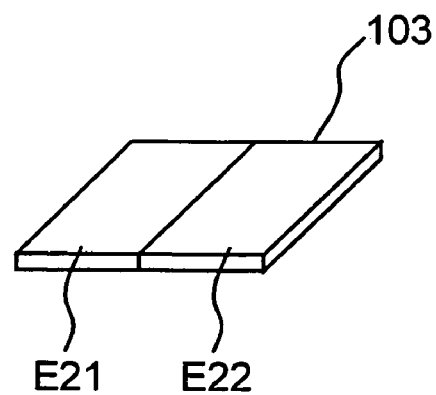
FIG. 14 shows a modification of the light-receiving element of the optical pickup device of the second embodiment.

Further the light-receiving element 16 may be divided into two regions. That is, as shown in FIG. 14, a two-part light-receiving element 103 having two light-receiving regions E21, E22 may be used instead of the light-receiving elements 16. In this case, supposing that outputs of the light-receiving regions E21, E22 are $O_{E21}$, $O_{E22}$, the push-pull signal PP and the offset correction signal SHFT should be expressed as follows:

$$PP\{(O_A+O_C)-(O_B+O_D)\}+(O_{E21}-O_{E22})$$

$$SHFT=(O_A+O_B+O_C+O_D)-\alpha(O_{E21}+O_{E22})$$

In this case, it is possible to obtain the effect of eliminating the generation of the initial offset of the push-pull signal PP and reducing the number of portions to be adjusted.

(Third Embodiment)

Figure 15:
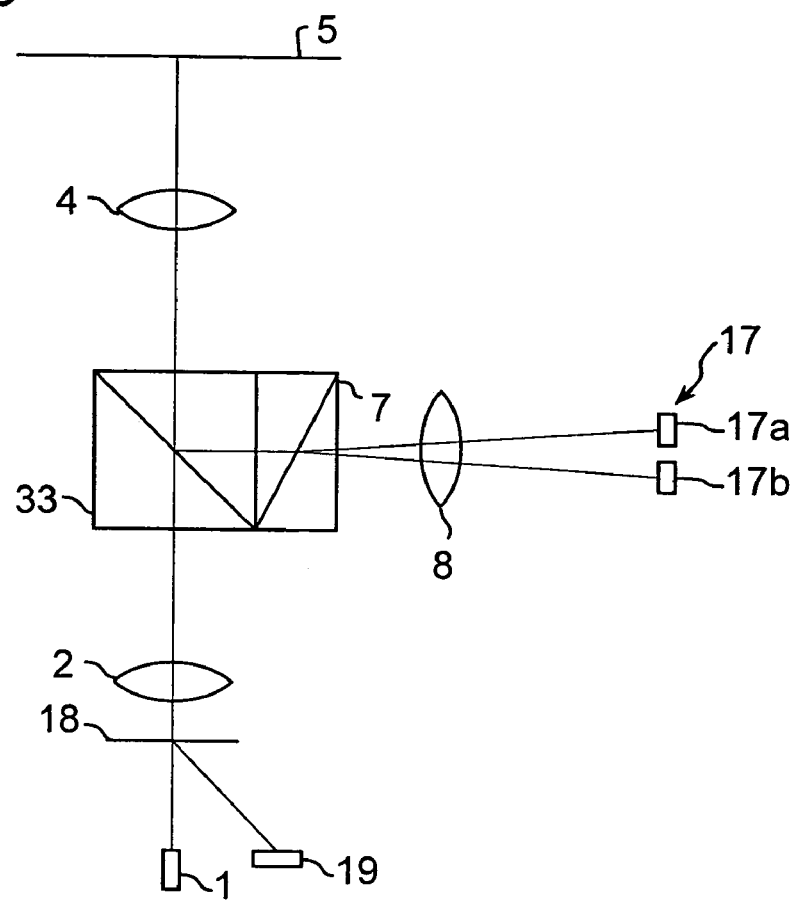
FIG. 15 is a schematic diagram of an optical pickup device of a third embodiment of the present invention.

FIG. 15 shows a schematic construction of an optical pickup device of a third embodiment of the present invention. In the optical pickup device, after light emitted from the semiconductor laser 1 passes through a diffraction element 18, the light is converted into parallel light by the collimating lens 2. Thereafter the light passes through a polarization beam splitter 33 and forms a spot on the surface of an optical disk 5 by an objective lens 4. The light reflected from the optical disk 5 becomes parallel light again by the objective lens 4 and is incident on the polarization beam splitter 33.

Of the light incident on the polarization beam splitter 33, light including magneto-optical signal components is reflected from the polarization beam splitter 33, is then split into two polarization components by the Wollaston prism 7, and is then incident on light-receiving elements 17a, 17b, of a photodetector 17, each serving as a second light-receiving element via a spot lens 8. Thereby information recorded on the optical disk 5 is reproduced.

On the other hand, light which has not been reflected from the polarization beam splitter 33 but passed therethrough is incident on the diffraction element 18 via the collimating lens 2, where the light is diffracted by the diffraction element 18, so that the diffracted light enters a photodetector 19.

Figure 16:
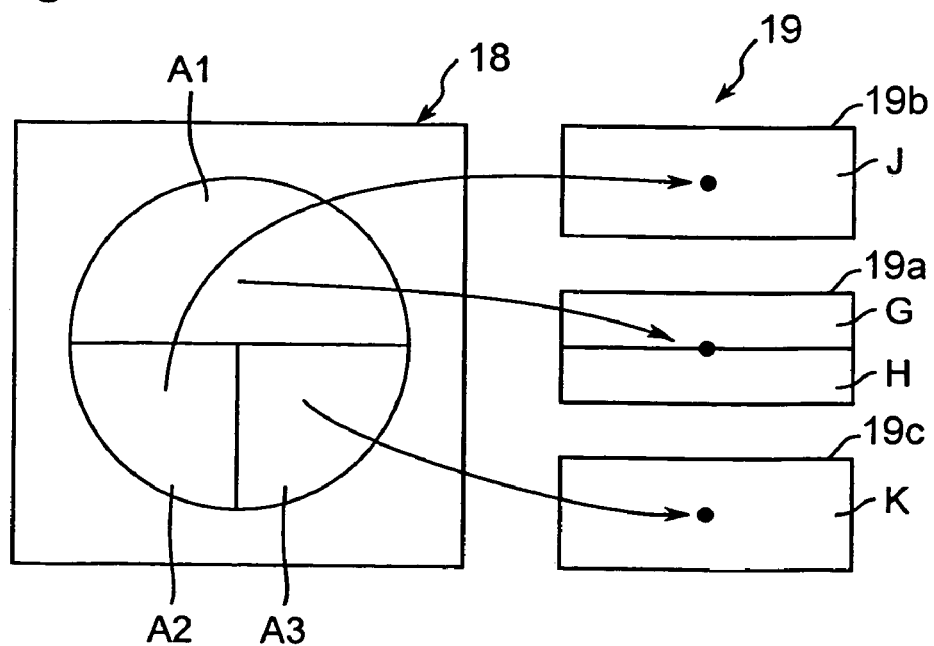
FIG. 16 explains a servo signal detection optical system of the optical pickup device of the third embodiment.

As shown in FIG. 16, the diffraction element 18 has three regions A1, A2, and A3. Light diffracted in the region A1 is focused on the center of a two-part light-receiving element 19a serving as a first light-receiving element, namely, on the boundary between a light-receiving region G and a light-receiving region H. Light diffracted in the region A2 is focused on the center of a light-receiving region J of a light-receiving element 19b serving as a first light-receiving element. Light diffracted in the region A3 is focused on the center of a light-receiving region K of a light-receiving element 19c serving as a first light-receiving element.

At this time, let outputs of the light-receiving regions G, H, J, and K be $O_G$, $O_H$, $O_J$, and $O_K$ respectively, the focus error signal FES can be generated by using a knife edge method and performing a computation of equation (31) shown below:

$$FES=O_G-O_H \quad (31)$$

The generation principle of the tracking error signal TES will be described below.

In the optical system described above, the push-pull signal PP can be generated by performing a computation of equation (32) shown below:

$$PP=O_J-O_K \quad (32)$$

If the push-pull signal PP is the tracking error signal TES, then the offset will be generated owing to the OL shift, as described previously as a problem to be solved.

Thus the offset correction signal SHFT is generated by a method described below, and a TES signal not affected by the OL shift is generated by performing a computation of equation (33) shown below:

$$TES=PP-\gamma \times (SHFT) \quad (33)$$

The method of generating the offset correction signal SHFT will be described below.

In the optical system of FIG. 15, the polarization beam splitter 33 has different reflectivities and transmittances for different polarization directions to detect the MO signal. That is, the polarization beam splitter 33 reflects the s-polarized light components entirely. Further, for the p-polarized light components, the polarization beam splitter 33 has transmission and reflection characteristics that its transmission efficiency or reflection efficiency changes gently according to the incident position of light.

More specifically, for example, the polarization beam splitter 33 is so constructed that the reflectivity thereof decreases linearly from its lower end to its upper end as viewed in FIG. 15. At this time, conversely, the transmittance of the polarization beam splitter 33 increases linearly from the lower end to the upper end in FIG. 15.

Because the polarization beam splitter 33 has such a construction, the polarization beam splitter 33 less transmits the incident p-polarized light on the more right-hand side in FIG. 15, that is, the transmitted light of the p-polarized light incident on the polarization beam splitter 33 decreases toward the right-hand side in FIG. 15. Conversely, reflected light of the p-polarized light incident on the polarization beam splitter 33 increases toward the right-hand side in FIG. 15.

When the objective lens 4 shifts to the right-hand side in FIG. 15, the intensity ($O_G+O_H+O_J+O_K$) of a spot of the p-polarized light which has transmitted through the polarization beam splitter 33 and has been diffracted by the diffraction element 18 is weak, or dark, as a whole, whereas the intensity ($O_L+O_M$) of a spot of the light which has been reflected from the polarization beam splitter 33 and is incident on the light-receiving elements 17a, 17b for detecting the MO signal is strong or bright as a whole. The light-receiving elements 17a, 17b have respective light-receiving regions L, M. $O_L$ is an output of the light-receiving region L and OM is an output of the light-receiving region M.

Therefore, if a gain α is adjusted so that in the state where there is no OL,

SHFT=($O_G+O_H+O_J+O_K$)−α($O_L+O_M$)=0, then

SHFT<0 when there is an OL shift toward the right-hand side in FIG. 15, and

SHFT>0 when there is an OL shift toward the left-hand side in FIG. 15.

That is, the offset correction signal SHFT becomes an offset signal that changes according to the direction and amount of the OL shift.

Figure 17:
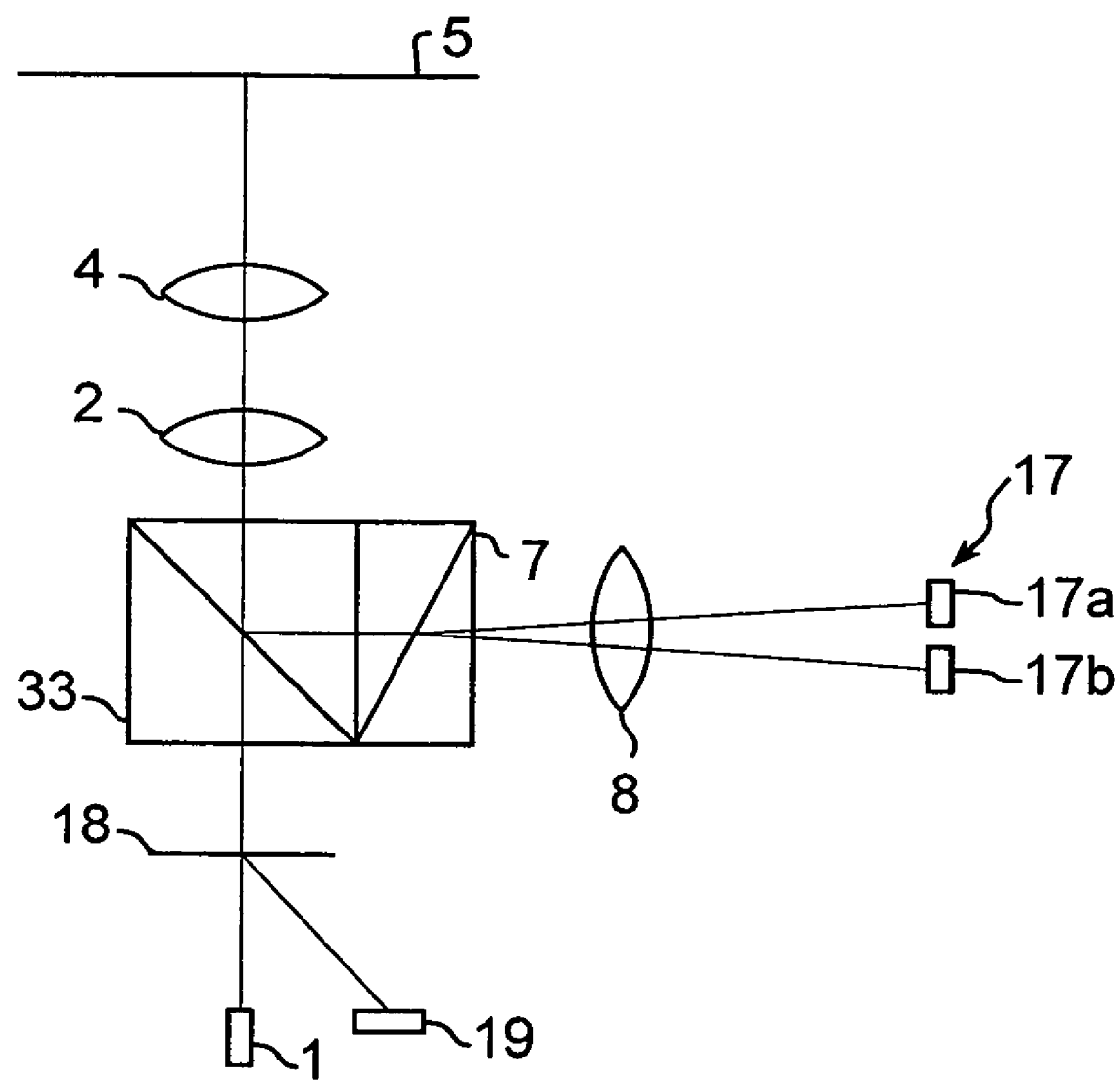
FIG. 17 shows a modification of the optical pickup device of the third embodiment.

In the optical system of FIG. 15, the polarization beam splitter 33 is disposed on a parallel light path. But as shown in FIG. 17, the polarization beam splitter 33 may be disposed on a radiation light path between the collimating lens 2 and the semiconductor laser 1. More specifically, the polarization beam splitter 33 may be disposed between the collimating lens 2 and the diffraction element 18.

The third embodiment is constructed so that depending on the position of incidence of the p-polarized light on the polarization beam splitter 33, the amount of light on the two-part light-receiving element 19a and the light-receiving elements 19b, 19c changes. However, the third embodiment may be constructed so that the transmission/reflection efficiency of the polarization beam splitter does not change depending on the incidence position of the light and that the light-receiving sensitivities of the two-part light-receiving element 19a and the light-receiving elements 19b, 19c are changed depending on the incidence position of light thereon.

Further, instead of changing the sensitivity of the light-receiving element, the two-part light-receiving element 19a and the light-receiving elements 19b, 19c may be provided with a filter whose transmittance changes for incident light. In this case, it is possible to obtain an effect similar to that obtained in the third embodiment.

(Fourth Embodiment)

Figure 18:
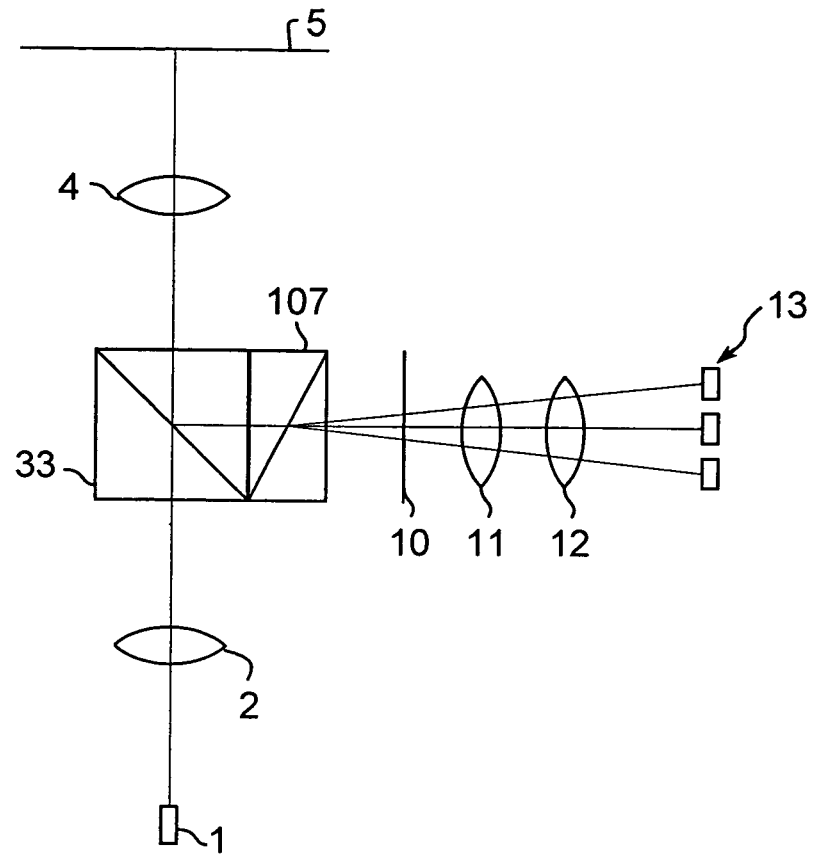
FIG. 18 is a schematic diagram of an optical pickup device of a fourth embodiment of the present invention.

FIG. 18 shows a schematic construction of an optical pickup device of a fourth embodiment of the present invention. In the optical pickup device, after light emitted from the semiconductor laser 1 is converted into parallel light by the collimating lens 2, the light passes through the polarization beam splitter 33 and forms a spot on the optical disk 5 by the objective lens 4.

The light reflected from the optical disk 5 becomes parallel light again by the objective lens 4 and a part of the light is reflected from the polarization beam splitter 33. Of the light reflected from the polarization beam splitter 33, light including magneto-optical signal components is split into three light beams by a three-beam Wollaston prism 107 serving as a light separation means, and the three light beams are then diffracted by the diffraction element 10. Then zero-order diffracted light and ±first-order diffracted lights are incident on the photodetector 13 via the cylindrical lens 11 and the spot lens 12. Thereby the servo signal and the MO signal are detected. Thus the servo signal and the MO signal can be generated in one optical system. Further because of the singularity of the optical system, the optical pickup device has an effect of greatly reducing the number of portions to be assembled and adjusted.

The detection of the servo signal in the optical system will be described below with reference to FIG. 19.

The zero-order diffracted light is applied in the form of a beam spot having astigmatism to light-receiving regions A, B, C, and D of the four-part light-receiving element 13a serving as a first light-receiving element via the cylindrical lens 11 and the spot lens 12. Supposing that outputs of the light-receiving regions A, B, C, and D are $O_A$, $O_B$, $O_C$, and $O_D$, respectively, the focus error signal FES can be generated by the astigmatism method by performing a computation of equation (41) shown below:

$$FES=(O_A+O_D)-(O_B+O_C) \qquad (41)$$

The MO signal is detected based on light beams incident on light-receiving regions MO1, MO2 of light-receiving elements 20a, 20b each serving as a third light-receiving element. That is, supposing that outputs of the light-receiving regions MO1, MO2 are denoted as $O_{MO1}$, $O_{MO2}$ respectively, the MO signal is detected by performing a computation of equation (42) shown below:

$$MO\ signal=O_{MO1}-O_{MO2} \qquad (42)$$

The generation principle of the tracking error signal TES is described below.

Based on a spot of the zero-order diffracted light incident on each of the light-receiving regions A, B, C, and D of the four-part light-receiving element 13a from the optical system, the push-pull signal PP can be generated by performing a computation of equation (43) shown below:

$$PP=(O_A+O_C)-(O_B+O_D) \qquad (43)$$

If the signal PP is the tracking error signal TES, an offset is generated owing to the OL (objective lens) shift as described previously as a problem to be solved.

Thus the offset correction signal SHFT is generated by a method described below and a TES signal not affected by the OL shift is generated by using a computation of equation (44) shown below.

$$TES=PP-\gamma\times(SHFT) \qquad (44)$$

The method of generating the offset correction signal SHFT will be described below.

In the optical system of FIG. 18, the diffraction element 10 has a characteristic that the diffraction efficiency changes gently according to the incidence position of light.

More specifically, as shown in FIG. 3, a grating pitch P is constant over the entire surface of the diffraction element 10. There is, however, a change in the ratio between a width L of a ridge portion 10a and a width G of a valley portion 10b. Defining the ratio of the valley portion 10b to the grating pitch P as a DUTY (=G/P), the DUTY changes linearly from the left end of the diffraction element 10 to the right end thereof in FIG. 3. Because the diffraction element 10 has the above construction, the ±first-order diffracted light of the light incident on the diffraction element 10 decreases gradually toward the right-hand end thereof. On the other hand, the zero-order diffracted light of the light incident on the diffraction element 10 increases gradually toward the right-hand end thereof.

For example, suppose that the wavelength of a light source is 405 nm, that the diffraction element 10 is a relief-type diffraction grating element using a quartz glass substrate, and that the depth of groove is 0.33 µm. As shown in FIG. 4, when there is a change in the DUTY from 0.6 to 0.85, the zero-order diffraction efficiency changes from 0.16 to 0.56 and the (+first-order)+(−first-order) diffraction efficiency changes from 0.64 to 0.15.

As another method of changing the diffraction efficiency, there is a method of gradually changing the groove depth. In this case, when the groove has a depth corresponding to one wavelength of light, the ±first-order diffraction efficiency is maximum. When the groove has a depth more or less than the depth corresponding to one wavelength of light, the diffraction efficiency becomes lower. Thus when grooves each having a depth falling within a range of less than one wavelength of light are formed, the diffraction element is so constructed that the grating pitch and the DUTY are constant all over the diffraction element and that the groove depth linearly changes so as to be gradually shallower from one end of the diffraction element to the other end thereof. Thereby the ±first-order diffracted light of the light incident on the diffraction element decreases gradually from the one end toward the other end of the diffraction element. When grooves each having a depth falling within a range of more than one wavelength of light are formed, the diffraction element is so constructed that the grating pitch and the DUTY are constant all over the diffraction element and that the groove depth linearly changes so as to be deeper from one end of the diffraction element to the other end thereof. Thereby the ±first-order diffracted light of the light incident on the diffraction element decreases gradually from the one end toward the other end of the diffraction element.

Figure 19:
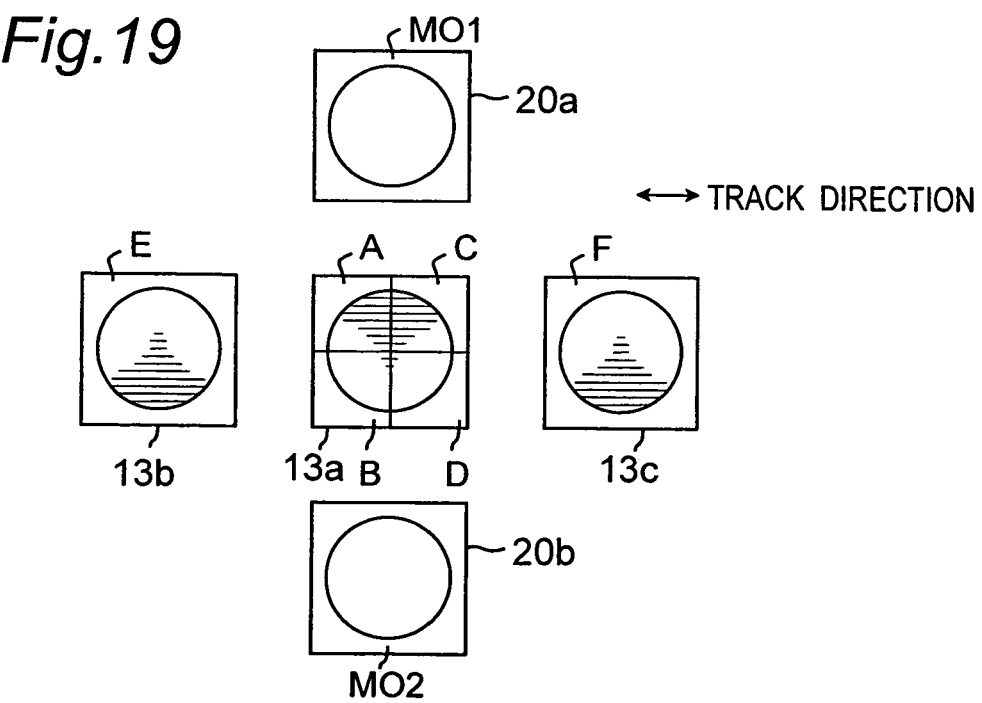
FIG. 19 explains the construction of a light-receiving element of the optical pickup device of the fourth embodiment.

Owing to the characteristic of the diffraction element 10, the spot of the zero-order diffracted light incident on the four-part light-receiving element 13a has an intensity distribution that becomes brighter toward the lower side of the four-part light-receiving element 13a as viewed in FIG. 19. On the other hand, a spot of the ±first-order diffracted light incident on the light-receiving regions E, F of light-receiving elements 13b, 13c, disposed at both sides of the four-part light-receiving element 13a, serving as second light-receiving elements has an intensity distribution that becomes darker toward the lower side of the light-receiving regions E, F as viewed in FIG. 19.

At this time, if the objective lens 4 shifts to one side, the intensity distribution of the spot of the zero-order diffracted light incident on the light-receiving regions A, B, C, and D of the four-part light-receiving element 13a is bright as a whole, whereas the intensity distributions of the spots of the ±first-order diffracted light incident on the light-receiving regions E, F of the light-receiving elements 13b, 13c are dark as a whole. When the objective lens 4 shifts to a side opposite to the one side, the intensity distribution of the spot of the zero-order-diffracted light incident on the light-receiving regions A, B, C, and D of the four-part light-receiving element 13a is dark as a whole, whereas the intensity distributions of the spots of the ±first-order diffracted lights incident on the light-receiving regions E, F of the light-receiving elements 13b, 13c are bright as a whole.

Therefore, if a gain α is adjusted such that, let outputs of the light-receiving regions E and F be $O_E$ and $O_F$, $SHFT=(O_A+O_B+O_C+O_D)-\alpha(O_E+O_F)=0$ in the state in which there is no OL shift, then SHFT>0 when there is an OL shift toward the right-hand side in FIG. 18, and SHFT<0 when there is an OL shift toward the left-hand side in FIG. 18.

That is, the offset correction signal SHFT becomes the offset signal that changes according to the direction and amount of the OL shift.

The fourth embodiment is constructed such that depending on the position of the light incident on the diffraction element, there is a change in the amounts of light on the light-receiving elements. However, the fourth embodiment may be constructed such that the transmission diffraction efficiency of the diffraction element does not change (the grating DUTY and groove depth are constant all over the diffraction element) depending on the incidence position of light and that the light-receiving sensitivities of the light-receiving elements change depending on the incidence position of light thereon. For example, if the fourth embodiment has a construction that as shown in FIG. 7, the light-receiving sensitivities of the light-receiving regions A, B, C, and D become gradually higher almost linearly downward as viewed in FIG. 19 and that the light-receiving sensitivities of the light-receiving regions E, F become gradually lower almost linearly downward as viewed in FIG. 19, $$TES=PP-\alpha\times(SHFT)$$

Then, if a gain α is adjusted so that:

$SHFT=(A+B+C+D)-\alpha(E+F)=0$ in the state where there is no OL shift, then,

SHFT>0 when there is an OL shift toward the right-hand side, and

SHFT<0 when there is an OL shift toward the left-hand side.

Further, instead of changing the sensitivity of the light-receiving element, as shown in FIG. 8, filters 101a, 101b, and 101c whose transmittances change for light incident on the four-part light-receiving element 13a and the light-receiving elements 13b, 13c may be disposed over the four-part light-receiving element 13a and the light-receiving elements 13b, 13c. In this case, an effect and advantage similar to that of the fourth embodiment can be obtained.

The light-receiving elements 13a, 13b may be divided into two regions respectively by a parting line extending in a track direction. That is, as shown in FIG. 9, two-part light-receiving elements 13d, 13e may be used instead of the light-receiving elements 13a, 13b. The two-part light-receiving element 13d has two light-receiving regions E1, E2, and the two-part light-receiving element 13e has two light-receiving regions F1, F2. In this case, let outputs of these light-receiving regions E1, E2, F1, and F2 be $O_{E1}$, $O_{E2}$, $O_{F1}$, and $O_{F2}$, then the push-pull signal PP and the offset correction signal SHFT should be expressed as follows:

$$PP=\{(O_A+O_C)-(O_B+O_D)\}+\beta\{(O_{E1}-O_{E2})+(O_{F1}-O_{F2})\}$$

$$SHFT=(O_A+O_B+O_C+O_D)-\alpha(O_{E1}+O_{E2}+O_{F1}+O_{F2}).$$

In this case, it is possible to obtain the effect of eliminating the generation of the initial offset of the push-pull signal PP and reducing the number of portions to be adjusted.

Figure 20:
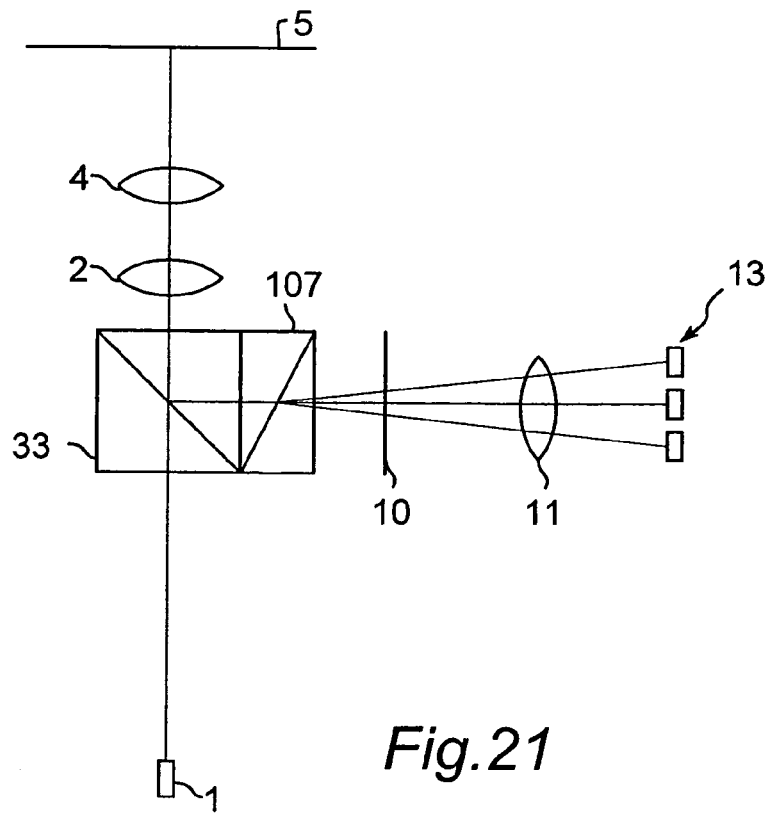
FIG. 20 shows a modification of the optical pickup device of the fourth embodiment.

In the fourth embodiment, the polarization beam splitter 33 is disposed on the parallel light path. But as shown in FIG. 20, the polarization beam splitter 33 may be disposed on a radiation light path between the semiconductor laser 1 and the collimating lens 2. In this case, because the collimating lens 2 also serves as a spot lens for narrowing the beam, it is possible to reduce the number of component parts. Further because it is possible to reduce the size of the signal detection optical system including the polarization beam splitter 33, it is possible to reduce the volume and weight of the optical pickup device and the cost thereof.

(Fifth Embodiment)

Figure 21:
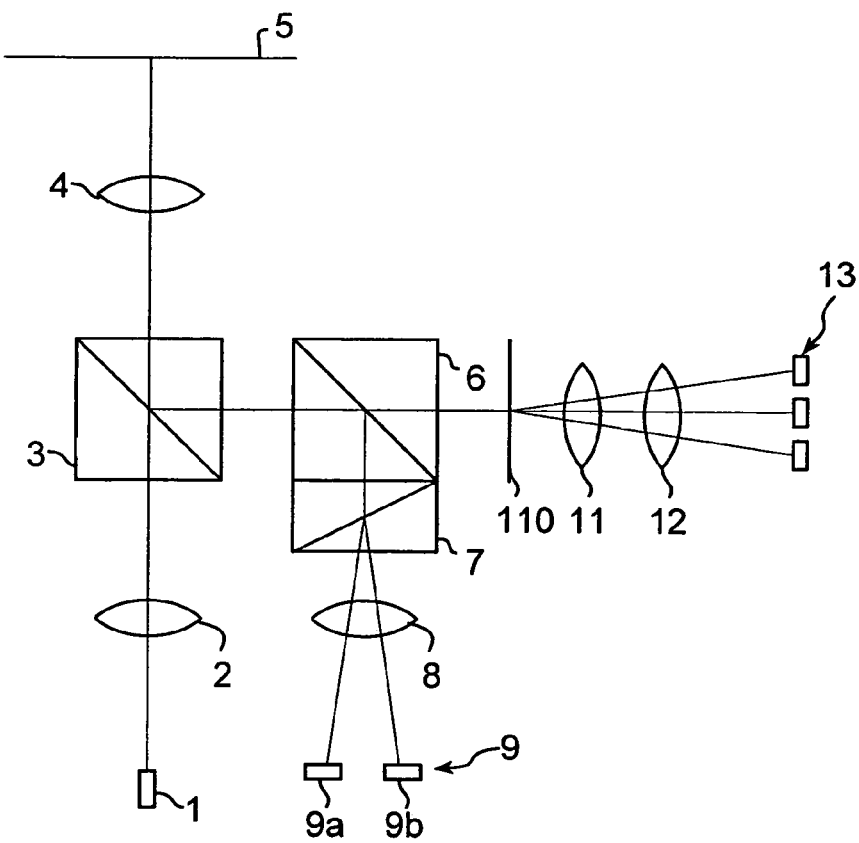
FIG. 21 is a schematic diagram of an optical pickup device of a fifth embodiment of the present invention.

FIG. 21 shows a schematic construction of an optical pickup device of a fifth embodiment of the present invention.

A diffraction element 110 of the fifth embodiment has two regions. In these regions, the diffraction efficiency changes gradually relative to each other. That is, the diffraction efficiencies of the two regions are opposite to each other in characteristics thereof along a parting line.

In the optical pickup device, after light emitted from the semiconductor laser 1 is converted into parallel light by the collimating lens 2, the light passes through the first polarization beam splitter 3 and forms a spot on the surface of the optical disk 5 by the objective lens 4. The light reflected from the optical disk 5 is made parallel light again by the objective lens 4, and part of the parallel light is reflected from the first polarization beam splitter 3.

Of the light reflected from the polarization beam splitter 3, light including the magneto-optical signal component is further reflected from the second polarization beam splitter 6, is then split into two polarization components by the Wollaston prism 7, and is then incident on the light-receiving elements 9a, 9b of the photodetector 9 via the spot lens 8. Thereby information recorded on the optical disk 5 is reproduced.

On the other hand, of the light reflected from the polarization beam splitter 3, light not including the magneto-optical signal component passes through the second polarization beam splitter 6 and is then diffracted by the diffraction element 110. The zero-order diffracted light and the ±first-order diffracted lights from the diffraction element 110 enter the photodetector 13 via the cylindrical lens 11 and the spot lens 12. Thereby the servo signal (focus error signal FES, tracking error signal TES) is detected.

The detection of the servo signal in the optical system will be described below.

Figure 22:
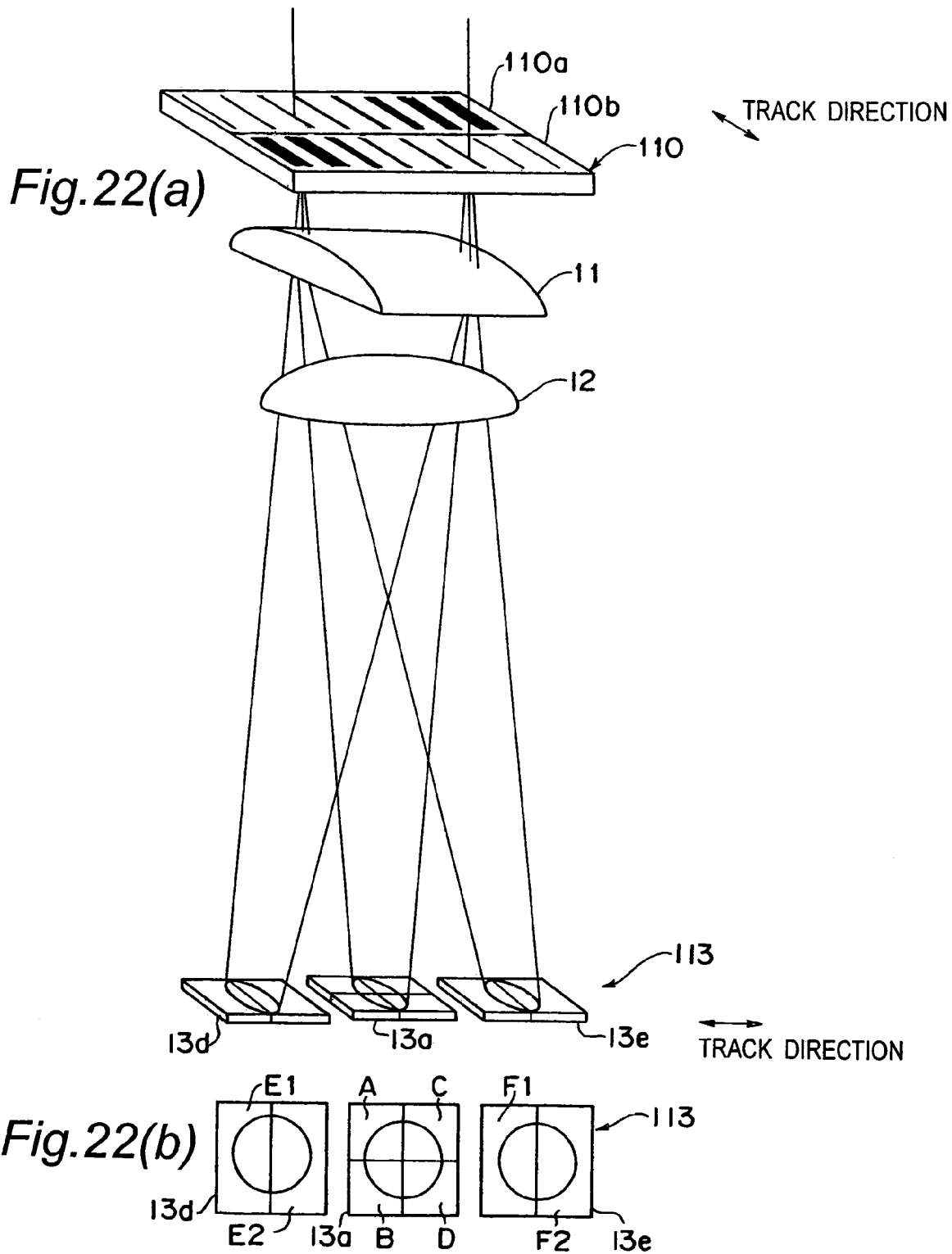
FIGS. 22(a) and 22(b) are explanatory views of a servo signal detection optical system of the optical pickup device of the fifth embodiment.

As shown in FIG. 22(b), the zero-order diffracted light is applied in the form of a beam spot having astigmatism to a four-part light-receiving element 13a serving as a first light-receiving element, via the cylindrical lens 11 and the spot lens 12.

As shown in FIG. 22(b), the four-part light-receiving element 13a has four light-receiving regions A, B, C, and D. Supposing that outputs of the light-receiving regions A, B, C, and D are $O_A$, $O_B$, $O_C$, and $O_D$ respectively, the focus error signal FES can be generated by using the astigmatism method and performing a computation of equation (51) shown below:

$$FES=(O_A+O_D)-(O_B+O_C) \quad (51)$$

The generation principle of the tracking error signal TES will be described below.

From the spot of the zero-order diffracted light incident on each of the light-receiving regions A, B, C, and D of the four-part light-receiving element 13a from the optical system, the push-pull signal PP can be generated by performing a computation of equation (52) shown below:

$$PP=(O_A+O_C)-(O_B+O_D) \quad (52)$$

If the push-pull signal PP is the tracking error signal TES, then an offset will be generated owing to the OL (objective lens) shift, as described previously as a problem to be solved.

Thus an offset correction signal SHFT is generated by a method described below, and a TES signal that is not affected by the OL shift is generated by performing a computation of equation (53) shown below.

$$TES=PP-\gamma\times(SHFT) \quad (53)$$

The method of generating the offset correction signal SHFT will be described below.

In the optical system of FIG. 22(a), the diffraction element 110 is divided into two regions 110a, 110b by a parting line extending in a radial direction. Each of the regions 110a, 110b has a characteristic that the diffraction efficiency changes gently according to the incidence position of light. A diffraction efficiency decrease direction in the region 110a is a diffraction efficiency increase direction in the region 110b. A diffraction efficiency increase direction in the region 110a is a diffraction efficiency decrease direction in the region 110b.

Figure 23:
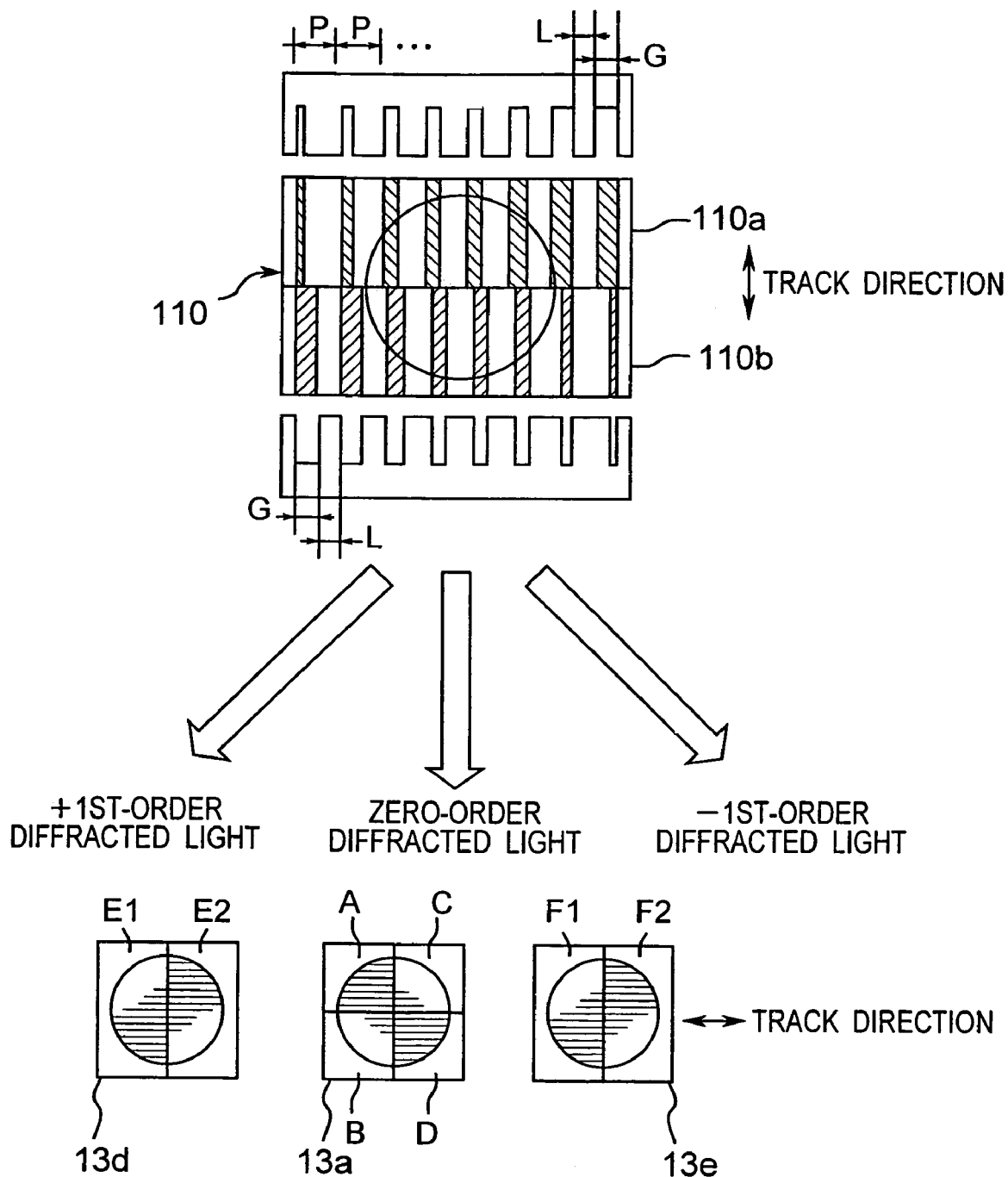
FIG. 23 explains a diffraction element of the optical pickup device of the fifth embodiment.

More specifically, as shown in FIG. 23, a grating pitch P is constant over the entire surface of the two regions 110a, 110b. There is, however, a change in the ratio between a width L of a ridge portion 10a and a width G of a valley portion 10b. Defining the ratio of the valley portion 10b to the grating pitch P as a DUTY (=G/P), the DUTY in each region 110a, 110b changes linearly from the left end of the diffraction element to the right end thereof in FIG. 23 relative to each other. Because the diffraction element 10 has the above construction, the ±first-order diffracted light of the light incident on the diffraction element 10 decreases gradually toward the right-hand end thereof in FIG. 23. That is, the characteristic of the change in the DUTY of the region 110a and the characteristic of the change in the DUTY of the region 110b are opposite to each other along the boundary between the regions 110a and 10b. Thereby the ±first-order diffracted light of the light incident on the region 110a of the diffraction element 110 increases toward the right-hand end of the diffraction element. Conversely, the zero-order diffracted light of the light incident on the region 110a of the diffraction element 110 decreases toward the right-hand end thereof. On the other hand, the ±first-order diffracted light of the light incident on the region 10b of the diffraction element 110 decreases toward the right-hand end thereof, but the zero-order diffracted light of the light incident on the region 110b of the diffraction element 110 increases toward the right-hand end thereof.

For example, suppose that the wavelength of a light source is 405 nm, that the diffraction element 110 is a relief-type diffraction grating element using a quartz glass substrate, and that the depth of groove is 0.33 μm. As shown in FIG. 4, when there is a change in the DUTY from 0.6 to 0.85, the zero-order diffraction efficiency changes from 0.16 to 0.56 and the (+first-order)+(−first-order) diffraction efficiency changes from 0.64 to 0.15.

As another method of changing the diffraction efficiency, there is a method of gradually changing the depth of the grooves. In this case, when the grooves have a depth corresponding to one wavelength of light, the ±first-order diffraction efficiency is maximum. When the groove has a depth larger or smaller than the depth corresponding to one wavelength of light, the diffraction efficiency becomes lower.

Thus, when the grooves each having a depth falling within a range of less than one wavelength of light are formed, the diffraction element 110 may be constructed so that the grating pitch and DUTY are constant all over the diffraction element. Then the groove depth in the region 110a is made to linearly change so as to be gradually shallower from one end of the diffraction element to the other end thereof. Thereby the ±first-order diffracted light of the light incident on the region 110a decreases gradually toward the other end of the diffraction element. Also, the groove depth in the region 110b is made to linearly change so as to become gradually deeper from the one end of the diffraction element to the other end thereof. Thereby the ±first-order diffracted light of the light incident on the region 10b increases gradually toward the other end of the diffraction element.

On the other hand, when the grooves each having a depth falling within a range of more than one wavelength of light are formed, the diffraction element 110 may also be constructed so that the grating pitch and DUTY are constant all over the diffraction element. Then, the groove depth in the region 110a is made to linearly change so as to become gradually deeper from the one end of the diffraction element to the other end thereof. Thereby the ±first-order diffracted light of the light incident on the region 110a decreases gradually toward the other end of the diffraction element. Also, the groove depth in the region 10b is made to linearly change so as to become gradually shallower from the one end of the diffraction element to the other end thereof. Thereby the ±first-order diffracted light of the light incident on the region 110b increases gradually toward the other end of the diffraction element.

As shown in FIG. 23, owing to the characteristic of the diffraction element 110, the spot of the zero-order diffracted light incident on the light-receiving regions A, B of the four-part light-receiving element 13a has an intensity distribution that becomes gradually brighter toward the lower side of the four-part light-receiving element 13a in FIG. 23. The spot of the zero-order diffracted light incident on the light-receiving regions C, D has an intensity distribution that becomes gradually darker toward the lower side of the four-part light-receiving element 13a in FIG. 23. The spot of the ±first-order diffracted light incident on the light-receiving regions E1, E2, F1, and F2 of light-receiving elements 13d, 13e disposed at both sides of the four-part light-receiving element 13a has an intensity distribution opposite to the spot of the zero-order diffracted light. These distributions are generated because the image made by the diffraction element is rotated by 90 degrees on the light-receiving regions owing to the operation of the cylindrical lens.

At this time, if the objective lens 4 shifts to the left-hand side in FIG. 21, a beam spot shifts on the diffraction element 10 to the right-hand side in FIG. 22(a). As a result, the intensity distributions of the spot of the zero-order diffracted light and of the ±first-order diffracted lights incident on the light-receiving regions A, B of the four-part light-receiving element 13a and the light-receiving regions E2, F2 of the two-part light-receiving elements 13d, 13e are bright as a whole, whereas the intensity distributions of the spots of the zero-order diffracted light and of the ±first-order diffracted lights incident on the light-receiving regions C, D of the four-part light-receiving element 13a and the light-receiving regions E1, F1 of the two-part light-receiving elements 13d, 13e respectively are dark as a whole. On the other hand, if the objective lens 4 shifts to the right-hand side in FIG. 21, a beam spot shifts on the diffraction element 10 to the left-hand side thereof in FIG. 22(a). As a result, the intensity distributions of the spots of the zero-order diffracted light and of the ±first-order diffracted lights incident on the light-receiving regions A, B of the four-part light-receiving element 13a and the light-receiving regions E2, F2 of the two-part light-receiving elements 13d, 13e are dark as a whole, whereas the intensity distributions of the spots of the zero-order diffracted light and of the ±first-order diffracted lights incident on the light-receiving regions C, D of the four-part light-receiving element 13a and the light-receiving regions E1, F1 of the two-part light-receiving elements 13d, 13e respectively are bright as a whole.

Therefore, if gains $\alpha$ and $\beta$ are adjusted such that, let outputs of the light-receiving regions E1, E2, F1, and F2 be $O_{E1}$, $O_{E2}$, $O_{F1}$, and $O_{E2}$, SHFT=$\{(O_A+O_B)+\alpha(O_{E2}+O_{F2})\}-\beta\{(O_C+O_D)+\alpha(O_{E1}+O_{F1})\}$=0 in the state in which there is no OL shift, then:

SHFT>0 when there is an OL shift toward the left-hand side in FIG. 21, and

SHFT<0 when there is an OL shift toward the right-hand side in FIG. 21.

That is, the offset correction signal SHFT becomes an offset signal that changes according to the direction and amount of the OL shift.

The fifth embodiment is constructed so that depending on the position of the light incident on the diffraction element, the amount of the light on the light-receiving element changes. However, the fifth embodiment may be constructed so that the transmission diffraction efficiency of the diffraction element does not change (grating DUTY and groove depth are constant respectively) depending on the incidence position of light and that the light-receiving sensitivities of the light-receiving elements change depending on the incidence position of light thereon. For example, if the fifth embodiment has a construction that the light-receiving sensitivities of the light-receiving regions A, B, E2, and F2 become gradually lower almost linearly toward the upper end thereof as viewed in FIG. 23 and that the light-receiving sensitivities of the light-receiving regions C, D, E1, and F1 become gradually higher almost linearly toward the upper end thereof as viewed in FIG. 23, the TES signal is detectable by performing the same computation as the above-described one.

Further, instead of changing the sensitivity of the light-receiving element, a filter whose transmittance changes for light incident on the light-receiving element may be disposed over the light-receiving element. In this case, a similar effect can be obtained.

Figure 24:
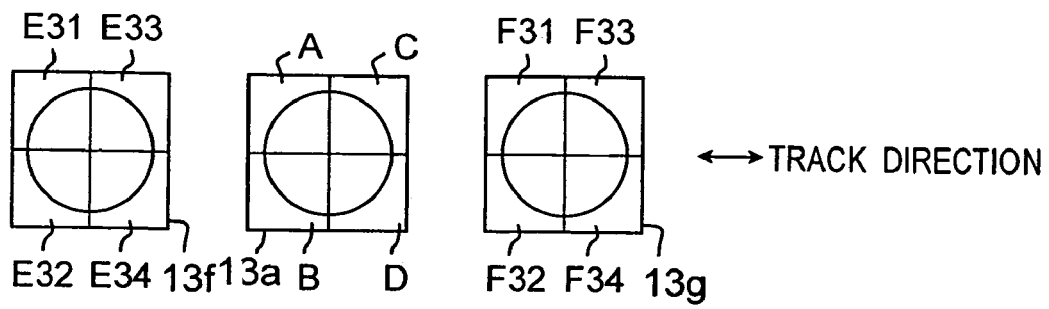
FIG. 24 shows a modification of the light-receiving element of the optical pickup device of the fifth embodiment.

As shown in FIG. 24, the two-part light-receiving elements 13d, 13e may be further divided into two regions in the track direction as well. That is, instead of the two-part light-receiving elements 13d, 13e, four-part light-receiving elements 13f, 13g may be used. The four-part light-receiving elements 13f and 13g have four light-receiving regions E31 through E34 and F31 through F34, respectively. In this case, supposing that the outputs of the light-receiving regions E31 through E34 and light-receiving regions F31 through F34 are $O_{E31}$ through $O_{E34}$ and $O_{F31}$ through $O_{F34}$ respectively, the push-pull signal PP and the offset correction signal SHFT should be expressed as follows:

$$PP=\{(O_A+O_C)-(O_B+O_D)\}+\{(O_{E31}+O_{E33})-\beta(O_{E32}+O_{E34})+(O_{F31}+O_{F33})-\beta'(O_{F32}+O_{F34})\}$$

$$SHFT=(O_A+O_B+O_C+O_D)-\alpha(O_{E31}+O_{E32}+O_{F31}+O_{F32}+O_{E33}+O_{E34}+O_{E33}+O_{E34})$$

In this case, it is possible to obtain the effect of eliminating the generation of the initial offset of the push-pull signal PP and reducing the number of portions to be adjusted.

In the fifth embodiment, the zero order diffracted light and the ±first order diffracted light are all utilized, but it is possible to use a method of utilizing only the zero order diffracted light or a method of utilizing only the zero order diffracted light and positive (+) first-order diffracted light. In this case, the computation of the servo signal is as described below:

When using only the zero order diffracted light, $$FES=(O_A+O_D)-(O_B+O_C)$$

$$TES=PP-\gamma\times(SHFT)$$

where $$PP=(O_A+O_C)-(O_B+O_D)$$

$$SHFT=\{(O_A+O_B)-\beta(O_C+O_D)\}$$

When using only the zero order diffracted light and positive first-order diffracted light, $$FES=(O_A+O_D)-(O_B+O_C)$$

$$TES=PP-\gamma\times(SHFT)$$

where $$PP=(O_A+O_C)-(O_B+O_D)$$

$$SHFT=\{(O_A+O_B)+\alpha(O_{E2})\}-\beta\{(O_C+O_D)+\alpha(O_{E1})\}$$

(Sixth Embodiment)

Figure 25:
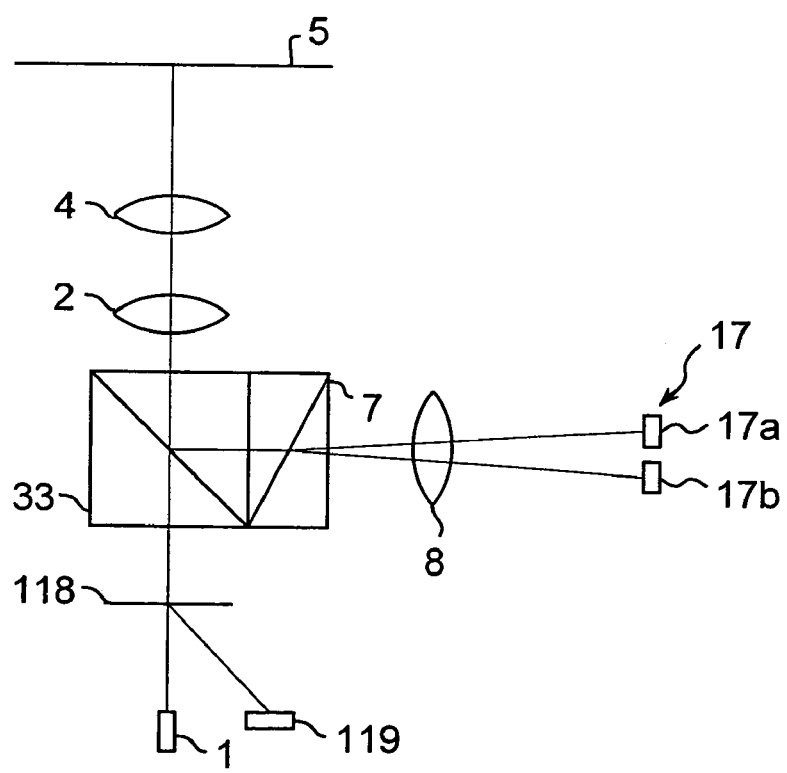
FIG. 25 is a schematic diagram of an optical pickup device of a sixth embodiment of the present invention.

FIG. 25 shows a schematic construction of an optical pickup device of a sixth embodiment of the present invention.

In the sixth embodiment, a servo signal detection function is added to the diffraction element of the fifth embodiment so that a servo signal detection system is independent of the MO signal detection optical system.

In the optical pickup device, light emitted from a semiconductor laser 1 is sent to a collimating lens 2 via a diffraction element 118 serving as a light-branching element and a polarization beam splitter 33, and converted into parallel light by the collimating lens 2. Thereafter the light forms a spot on the surface of an optical disk 5 by an objective lens 4. The light reflected from the optical disk 5 becomes parallel light again by the objective lens 4 and is incident on the polarization beam splitter 33 via the collimating lens 2.

Of the light incident on the polarization beam splitter 33, light including magneto-optical signal components is reflected from the polarization beam splitter 33, is then split into two polarization components by Wollaston prism 7. The two polarization components enter light-receiving elements 17a, 17b serving as third light-receiving elements of a photodetector 17 via a spot lens 8. Thereby information recorded on the optical disk 5 is reproduced.

Figure 26:
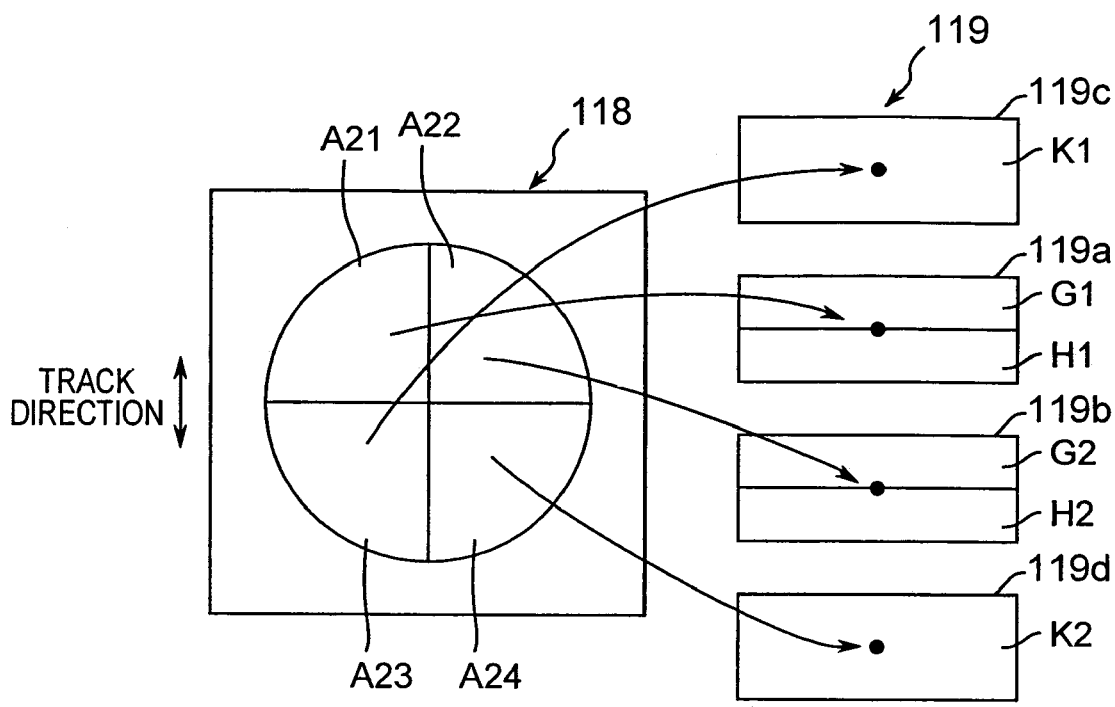
FIG. 26 explains a servo signal detection optical system of the optical pickup device of the sixth embodiment.

Of the light incident on the polarization beam splitter 33, light including no magneto-optical signal component passes through the polarization beam splitter 33, is then diffracted by the diffraction element 118, and enters the photodetector 119. As shown in FIG. 26, the photodetector 119 has two-part light-receiving elements 119a, 119b serving as the first light-receiving element, and light-receiving elements 119c, 119d serving as the second light-receiving element. The two-part light-receiving elements 119a, 119b and the light-receiving elements 119c, 119d receive refracted light from the diffraction element 118. The diffraction element 118 consists of four regions A21, A22, A23, and A24. Refracted light from the region A21 is focused on the center between light-receiving regions G1 and H1 of the two-part light-receiving element 119a. Refracted light from the region A22 is focused on the center between light-receiving regions G2 and H2 of the two-part light-receiving element 119b. Refracted light from the region A23 is focused on the center of a light-receiving region K1 of the light-receiving element 119c. Refracted light from the region A24 is focused on the center of a light-receiving region K2 of the light-receiving element 119d.

At this time, supposing that outputs of the light-receiving regions G1, H1, K1, ... are denoted as $O_{G1}$, $O_{H1}$, $O_{K1}$, ... respectively, the focus error signal FES can be generated by using the knife edge method and performing a computation of equation (61) shown below:

$$FES=(O_{G1}-O_{H1})+(O_{G2}-O_{H2}) \quad (61)$$

The generation principle of the tracking error signal TES will be described below.

In the optical system, the push-pull signal PP can be generated by performing a computation of equation (62) shown below:

$$PP=(O_{G1}+O_{H1}+O_{K1})-(O_{G2}+O_{H2}+O_{K2}) \quad (62)$$

If the push-pull signal PP is the tracking error signal TES, then the offset may be generated owing to the OL shift, as described previously as a problem to be solved.

Thus the offset correction signal SHFT is generated by a method described below, and a TES signal not affected by the OL shift is generated by performing a computation of equation (63) shown below:

$$TES=PP-\gamma\times(SHFT) \quad (63)$$

The method of generating the offset correction signal SHFT will be described below.

The diffraction element 118 has a characteristic that its diffraction efficiency changes gently depending on the incidence position of light.

More specifically, the diffraction element 118 is divided into the four regions A21 through A24. A grating pitch P of each of the regions A21 through A24 corresponds to a diffraction angle set to converge light on the corresponding one of the two-part light-receiving elements 119a, 119b and the light-receiving elements 119c, 119d. In the diffraction element 118, however, the ratio between a width L of a ridge portion and a width G of a valley portion is changed. Defining the ratio of the valley portion to the grating pitch P as a DUTY (=G/P), the DUTY in each of the regions A21 through A24 changes linearly from the left side to the right side as viewed in FIG. 26. Because the diffraction element 118 has the above construction, the ±first-order diffracted light of the light incident on each of the regions A21, A22 of the diffraction element 118 decreases gradually toward the right-hand end thereof in FIG. 26. On the other hand, the ±first-order diffracted light of the light incident on each of the regions A23, A23 of the diffraction element 118 increases gradually toward the right-hand end thereof in FIG. 26.

More specifically, for example, suppose that the wavelength of a light source is 405 nm, that the diffraction element 10 is a relief-type diffraction grating element using a quartz glass substrate, and that the depth of groove is 0.33 μm. As shown in FIG. 4, when there is a change in the DUTY from 0.6 to 0.85, the zero-order diffraction efficiency changes from 0.16 to 0.56 and the (+first-order)+(−first-order) diffraction efficiency changes from 0.64 to 0.15.

As another method of changing the diffraction efficiency, there is a method of gradually changing the groove depth. In this case, when the groove has a depth corresponding to one wavelength of light, the ±first-order diffraction efficiency is maximum. When the groove has a depth more or less than the depth corresponding to one wavelength of light, the diffraction efficiency becomes lower. Thus when grooves each having a depth falling within a range of less than one wavelength of light are formed, the diffraction element is so constructed that the grating pitch and the DUTY are constant all over the diffraction element and that the groove depth linearly changes so as to be gradually shallower from one end of the diffraction element to the other end thereof. Thereby the ±first-order diffracted light of the light incident on the diffraction element decreases gradually from the one end toward the other end of the diffraction element. When grooves each having a depth falling within a range of more than one wavelength of light are formed, the diffraction element is so constructed that the grating pitch and the DUTY are constant all over the diffraction element and that the groove depth linearly changes so as to be deeper from one end of the diffraction element to the other end thereof. Thereby the ±first-order diffracted light of the light incident on the diffraction element decreases gradually from the one end toward the other end of the diffraction element.

Thus, the diffraction element 118 is given a characteristic that the ±first-order diffracted lights of the light incident on the regions A21, A22 decrease gradually toward the right-hand end thereof in FIG. 26. On the other hand, the ±first-order diffracted light of the light incident on the regions A23, A24 increases gradually toward the right-hand end thereof in FIG. 26.

When the objective lens 4 shifts so that the light beam shifts to the right-hand side in FIG. 25 on the diffraction element 118, the intensity distributions of the spots of the ±first-order diffracted lights incident on the light-receiving regions G1, H1; and G2, H2 are dark as a whole, whereas the intensity distributions of the spots of the ±first-order diffracted lights incident on the light-receiving regions K1, K2 are bright as a whole. On the other hand, when the objective lens 4 shifts conversely so that the light beam shifts to the left-hand side in FIG. 25 on the diffraction element 118, the intensity distributions of the spots of the ±first-order diffracted lights incident on the light-receiving regions G1, H1; and G2, H2 are bright as a whole, whereas the intensity distributions of the spots of the ±first-order diffracted lights incident on the light-receiving regions K1, K2 are dark as a whole.

Therefore if a gain α is adjusted such that

SHFT $(O_{G1}+O_{H1}+O_{G2}+O_{H2})-\alpha(O_{K1}+O_{K2})=0$ in the state in which there is no OL shift, then SHFT<0 when there is an OL shift toward the right-hand side in FIG. 25, and SHFT>0 when there is an OL shift toward the left-hand side in FIG. 25.

That is, the offset correction signal SHFT becomes an offset signal that changes according to the direction and amount of the OL shift.

Figure 27:
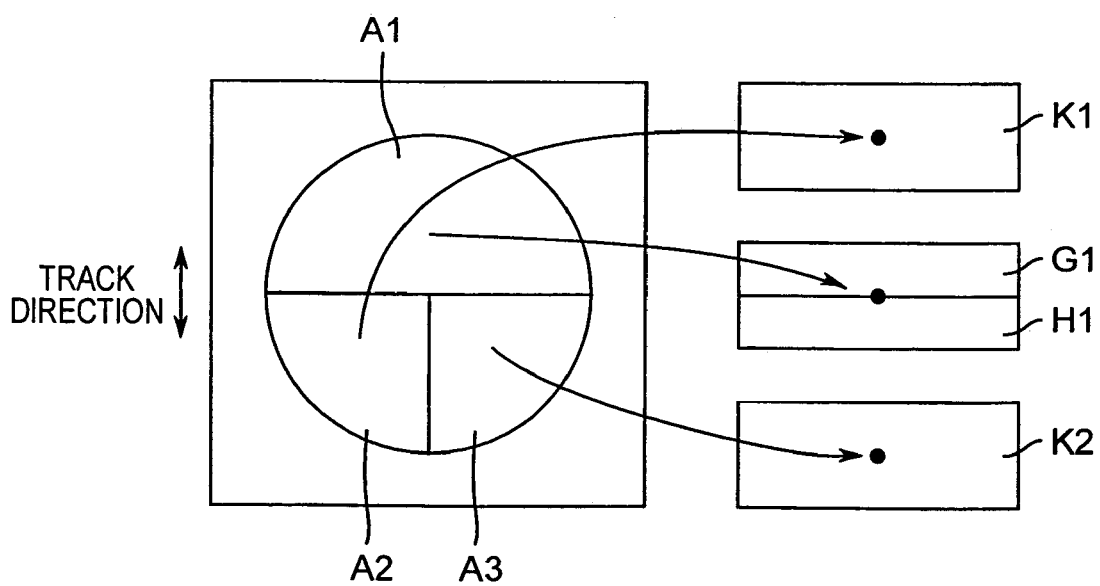
FIG. 27 shows a modification of the servo signal detection optical system of the optical pickup device of the sixth embodiment.

The diffraction element 118 and the photodetector are not limited to the aforementioned configuration, but any configuration can be adopted provided that the focus error signal FES and the tracking error signal TES (including push-pull signal PP and offset correction signal SHFT) can be detected thereby. For example, a construction shown in FIG. 27 may be used. Specifically, the diffraction element 18 is divided into three regions A1, A2, and A3. The photodetector is constructed such that light diffracted from the region A1 is focused on the center disposed between light-receiving regions G1 and H1 of the two-part light-receiving element 119a, that light diffracted from the region A2 is focused on the center of the light-receiving region K1 of the light-receiving element, and that light diffracted from the region A3 is focused on the center of the light-receiving region K2 of the other light-receiving element. In this case, the diffraction element has a characteristic that owing to a change of the DUTY, a change of the groove depth or formation of a filter on a rear surface of the diffraction element, the ±first-order diffracted light of light incident on the region A1 decreases toward the right-hand side of the region as viewed in FIG. 27, and the ±first-order diffracted light of light incident on the regions A3, A4 increases toward the right-hand side of the regions as viewed in FIG. 27.

At this time, supposing that outputs of the light-receiving regions G1, H1, K1, and K2 are $O_{G1}$, $O_{H1}$, $O_{K1}$, and $O_{K2}$ respectively, the focus error signal FES and the tracking error signal TES are generated by the knife edge method by performing a computation of equations (64), (65) shown below:

$$FES=O_G-O_H \quad (64)$$

$$TES=PP-\gamma\times(SHFT) \quad (65)$$

where the push-pull signal PP and the offset correction signal SHFT are expressed as follows:

$$PP=O_{K1}-O_{K2}$$

$$SHFT=(G1+H1)-\alpha(K1+K2)$$

An effect similar to that of the sixth embodiment can be obtained by inserting a filter whose transmittance changes for diffracted light from the diffraction element or forming the rear surface of the diffraction element with a filter whose transmittance changes, instead of changing the diffraction efficiency of the diffraction element.

(Seventh Embodiment)

Figure 28:
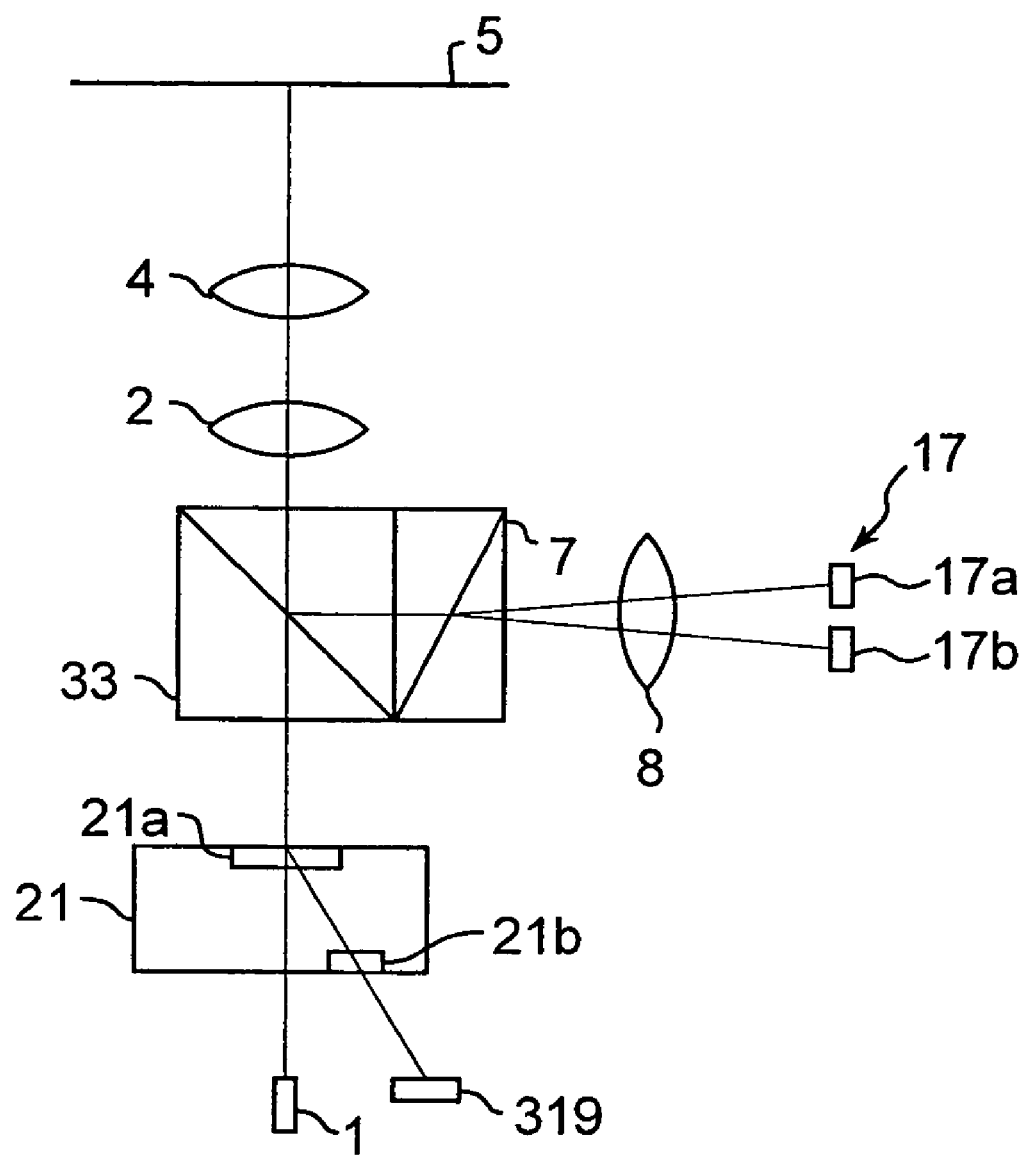
FIG. 28 is a schematic diagram showing an optical pickup device of a seventh embodiment of the present invention.

FIG. 28 shows a schematic construction of an optical pickup device of a seventh embodiment of the present invention.

The gist of the seventh embodiment is to separate the MO signal detection system and the servo signal detection system from each other and allow the servo signal detection system to generate the focus error signal FES and the tracking error signal TES (including the push-pull signal PP and the offset correction signal SHFT) by an optical system using a diffraction element.

In the optical pickup device, light emitted from a semiconductor laser 1 is sent to a collimating lens 2 via a diffraction element 21 and a polarization beam splitter 33, and converted into parallel light by the collimating lens 2. Thereafter the light forms a spot on the surface of an optical disk 5 by an objective lens 4. The light reflected from the optical disk 5 becomes parallel light again by the objective lens 4 and is incident on the polarization beam splitter 33 via the collimating lens 2.

Of the light incident on the polarization beam splitter 33, light including magneto-optical signal components is reflected from the polarization beam splitter 33, is then split into two polarization components by Wollaston prism 7. The two polarization components enter light-receiving elements 17a, 17b serving as third light-receiving elements of a photodetector 17 via a spot lens 8. Thereby information recorded on the optical disk 5 is reproduced.

On the other hand, of the light incident on the polarization beam splitter 33, light including no magneto-optical signal component passes through the polarization beam splitter 33, is then diffracted by a first hologram surface 21a of a diffraction element 21, is then split into the zero-order diffracted light and the ±first-order diffracted lights by a second hologram surface 21b. Those diffracted lights are received by a photodetector 319. As shown in FIG. 29(c), the photodetector 319 has a four-part light-receiving element 319a and light-receiving elements 319b, 319c disposed at both sides of the four-part light-receiving element 319a.

As shown in FIGS. 29(a), 29(b), and 29(c), the first hologram surface 21a is divided into two regions A31, A32. Refracted light from the region A31 is split into three beams by the second hologram surface 21b. Of the three beams, a main beam is focused on the center of a boundary between light-receiving regions G22 and H22 of the four-part light-receiving element 319a. Sub-beams out of the three beams are focused on the light-receiving regions K21, K22 of the light-receiving elements 319b, 319c, respectively. On the other hand, refracted light from the region A32 is split into three beams by the second hologram surface 21b. A main beam of the three beams is focused on the center of a boundary between the other light-receiving regions G21 and H21 of the four-part light-receiving element 319a. Sub-beams of the three beams are focused at the light-receiving regions K21, K22 of the light-receiving elements 319b, 319c respectively.

Let outputs of the light-receiving regions G21, H21, K21, ... be $O_{G21}$, $O_{H21}$, $O_{K21}$, respectively, the focus error signal FES can be generated by the knife edge method performing a computation of equation (71) shown below:

$$FES = (O_{G22} - O_{H22}) + (O_{G21} - O_{H21}) \tag{71}$$

The generation principle of the tracking error signal TES will be described below.

In the optical system, the push-pull signal PP can be generated by performing a computation of equation (72) shown below:

$$PP = (O_{G22} + O_{H22}) - (O_{G21} + O_{H21}) \tag{72}$$

If the push-pull signal PP is the tracking error signal TES, then the offset may be generated owing to the OL shift, as described previously as a problem to be solved.

Thus the offset correction signal SHFT is generated by a method described below, and the TES signal not affected by the OL shift is generated by performing a computation of equation (73) shown below:

$$TES = PP - \gamma \times (SHFT) \tag{73}$$

The method of generating the offset correction signal SHFT will be described below.

Regarding the setting of the diffraction efficiency of each of the hologram surfaces, the first hologram surface 21a has a feature that its diffraction efficiency is entirely uniform, and the second hologram surface 21b has a feature that its diffraction efficiency changes gently according to the incidence position of light, as will be described below.

More specifically, the grating pitch P of the second hologram surface 21b is constant all over the surface but the DUTY, which is the ratio between a width L of a ridge portion and a width G of a valley portion, changes gently from a lower position in FIG. 29 toward an upper position in FIG. 29 so that the spots of the zero-order diffracted light from the second hologram surface 21b incident on the light-receiving regions G21, H21; G22, H22 of the four-part light-receiving element 319a have respective intensity distributions that become brighter toward the upper end thereof in FIG. 29 and that the spots of the ±first-order diffracted lights from the second hologram surface 21b incident on the light-receiving regions K21, K22 of the light-receiving elements disposed at both sides of the four-part light-receiving element have respective intensity distributions that become darker toward the upper end thereof in FIG. 29. Alternatively, the grating pitch P and the DUTY of the second hologram surface may be constant, but the groove depth may be changed gently from the lower position toward the upper position in FIG. 29.

At this time, if the objective lens 4 shifts to the rear side of the drawing sheet of FIG. 28, the beam spot on the second hologram surface 21b shifts to the upper side thereof as viewed in FIG. 29. As a result, the intensity distributions of the spots of the zero-order diffracted lights incident on the light-receiving regions G21, H21, G22, and H22 of the four-part light-receiving element 319a are bright as a whole, whereas the intensity distributions of the spots of the ±first-order diffracted lights incident on the light-receiving regions K21, K22 of the other light-receiving elements are dark as a whole. Conversely, if the objective lens 4 shifts to the front side of the drawing sheet of FIG. 28, the beam spot on the second hologram surface 21b shifts to the lower side thereof as viewed in FIG. 29. As a result, the intensity distributions of the spots of the zero-order diffracted light incident on the light-receiving regions G21, H21, G22, and H22 of the four-part light-receiving element 319a are dark as a whole, whereas the intensity distributions of the spots of the ±first-order diffracted lights incident on the light-receiving regions K21, K22 of the other light-receiving elements are bright as a whole.

Therefore, if a gain α is adjusted such that

SHFT=$(O_{G22}+O_{H22}+O_{G21}+O_{H21})-\alpha(O_{K21}+O_{K22})=0$ in the state where there is no OL shift, then SHFT>0 when there is an OL shift toward the rear side of the drawing sheet of FIG. 28, and SHFT<0 when there is an OL shift toward the front side of the drawing sheet of FIG. 28.

That is, the offset correction signal SHFT becomes an offset signal that changes according to the direction and amount of the OL shift.

The light-receiving regions K21, K22 of the light-receiving elements may be divided into two regions, as shown in FIG. 29(d). That is, it is possible to use a light-receiving element having two light-receiving regions L21, K31 and a light-receiving element having two light-receiving regions L22, K32.

In this case, let outputs of the light-receiving regions L21, K31, ... be $O_{L21}$, $O_{K31}$, ..., the push-pull signal PP and the offset correction signal SHFT should be expressed as follows:

$$PP = \{(O_{G22}+O_{H22})-(O_{G21}+O_{H21})\}+\alpha\{(O_{K31}+O_{K32})-(O_{L21}+O_{L22})\}$$

$$SHFT = \{(O_{G22}+O_{H22})+(O_{G21}+OH21)\}+\beta\{(O_{K31}+O_{K32})+(O_{L21}+O_{L22})\}$$

In this case, it is possible to obtain the effect of eliminating the generation of the initial offset of the push-pull signal PP and reducing the number of portions to be adjusted.

In the construction of the seventh embodiment, the hologram surface 21a of the diffraction element 21 is a transmitting surface of a luminous flux of light emitted by the light source and traveling to the optical disk, and has no light-amount distribution function. Therefore the optical intensity distribution of the transmitted light is not changed by the diffraction element 21 (although transmittance of the entire diffraction element decreases), and thus a converged spot on the surface of the magneto-optical disk is not affected adversely.

(Eighth Embodiment)

Figure 30:
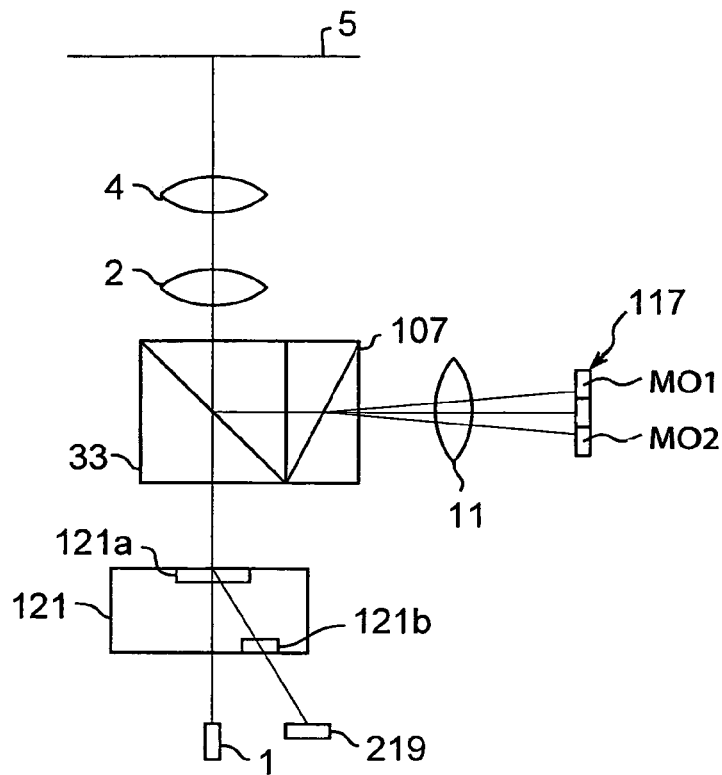
FIG. 30 is a schematic diagram showing an optical pickup device of an eighth embodiment of the present invention.

FIG. 30 shows a schematic construction of an optical pickup device of an eighth embodiment of the present invention.

The gist of the eighth embodiment is to detect the MO signal, the focus error signal FES, and the push-pull signal by the MO signal detection system and detect the offset correction signal SHFT by the diffraction element.

In the optical pickup device, light emitted from a semiconductor laser 1 is sent to a collimating lens 2 via a diffraction element 121 and a polarization beam splitter 33, and converted into parallel light by the collimating lens 2. Thereafter the light forms a spot on the surface of an optical disk 5 by an objective lens 4. The light reflected from the optical disk 5 becomes parallel light again by the objective lens 4 and is incident on the polarization beam splitter 33.

Of the light incident on the polarization beam splitter 33, light including magneto-optical signal components is reflected from the polarization beam splitter 33, is then split into three beams according to polarization components by a three-beam Wollaston prism 107. The split light is then applied as a beam spot having astigmatism to a four-part light-receiving element 13a of a photodetector 117 via the cylindrical lens 11. Supposing that outputs of the four light-receiving regions A, B, C, and D are $O_A$, $O_B$, $O_C$, and $O_D$ respectively, the focus error signal FES can be generated by using the astigmatism method and performing a computation of equation (81) shown below:

$$FES=(O_A+O_D)-(O_B+O_C) \quad (81)$$

The push-pull signal PP can be generated by performing a computation of an equation (82) shown below:

$$PP=(O_A+O_C)-(O_B+O_D) \quad (82)$$

Although not shown, the MO signal is detected based on light incident on light-receiving regions MO1, MO2 of light-receiving elements, serving as the third light-receiving elements, disposed in the vicinity of the four-part light-receiving element. That is, supposing that outputs of the four light-receiving regions MO1, MO2 are $O_{MO1}$, $O_{MO2}$, respectively, the MO signal FES is detected by performing a computation of equation (83) shown below:

$$FES=O_{MO1}-O_{MO2} \quad (83)$$

Of the light incident on the polarization beam splitter 33, light not including the magneto-optical signal component passes through the polarization beam splitter 33 and then enters a diffraction element 121 serving as a light-branching element so that the light is diffracted by a first hologram surface 121a. The diffracted light is then split into the zero-order diffracted light and the ±first-order diffracted lights by a second hologram surface 121b, and incident on a photodetector 219.

Figure 31:
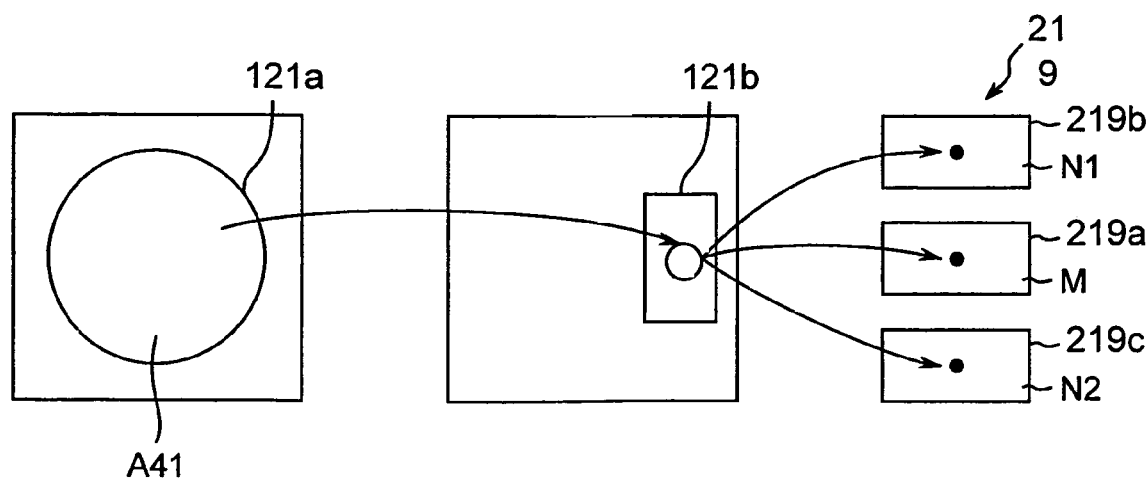
FIG. 31 shows a servo signal detection optical system of the optical pickup device of the eighth embodiment.
Figure 32:
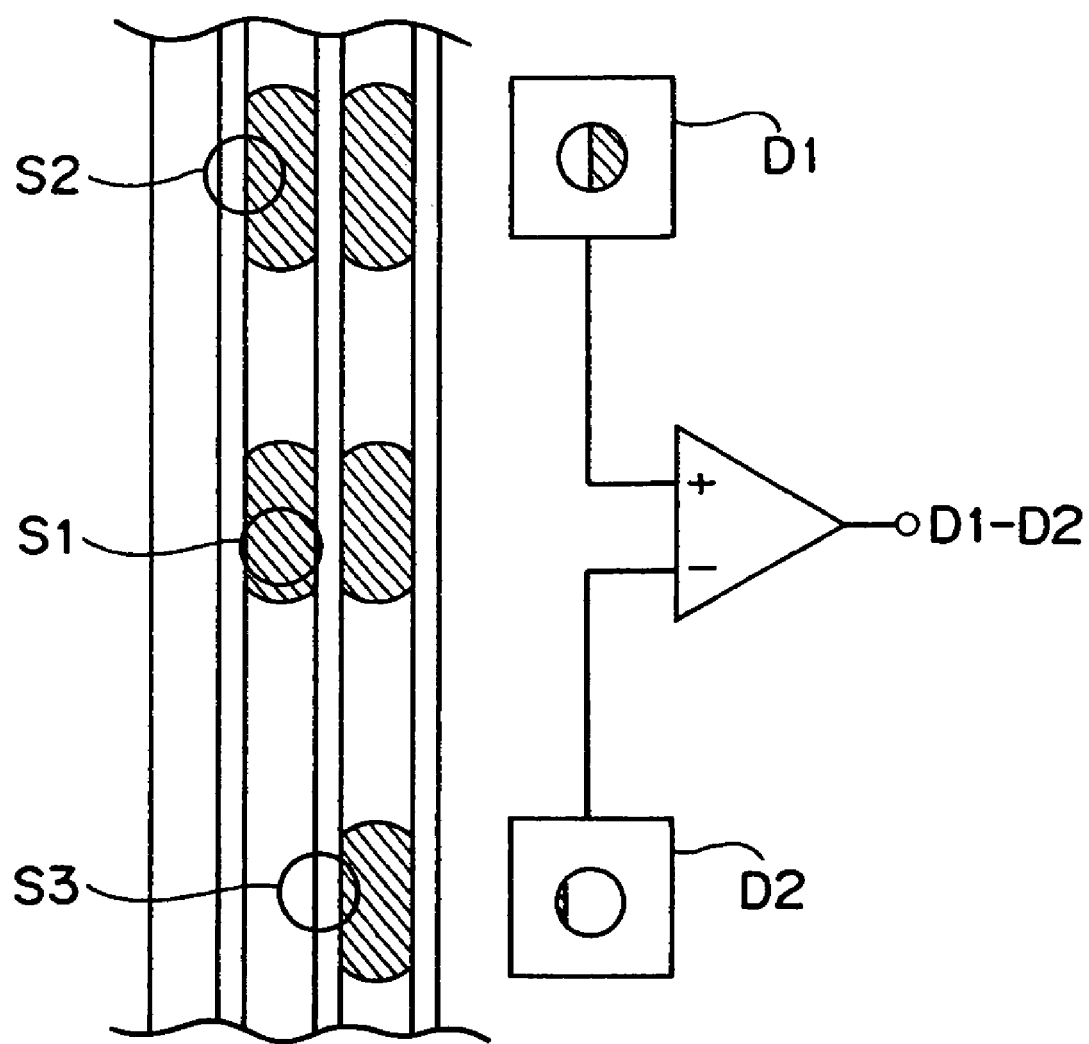
FIG. 32 explains a three-beam method which is a conventional tracking servo method for optical pickup devices.
Figure 33A:
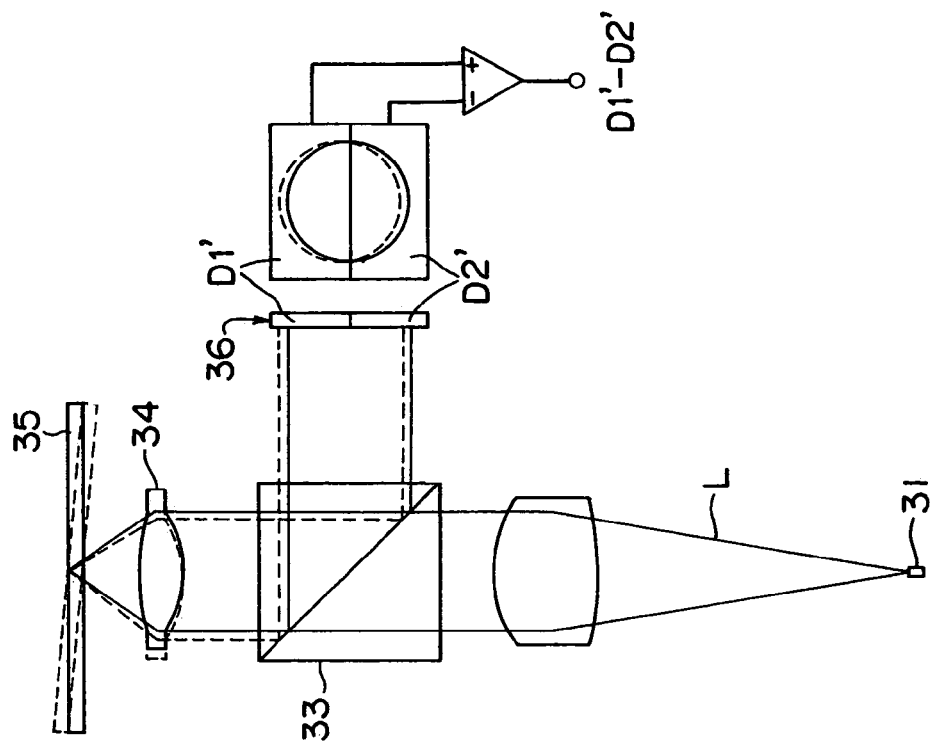
FIGS. 33(a) and 33(b) explain a push pull method which is a conventional tracking servo method for optical pickup devices.
Figure 33B:
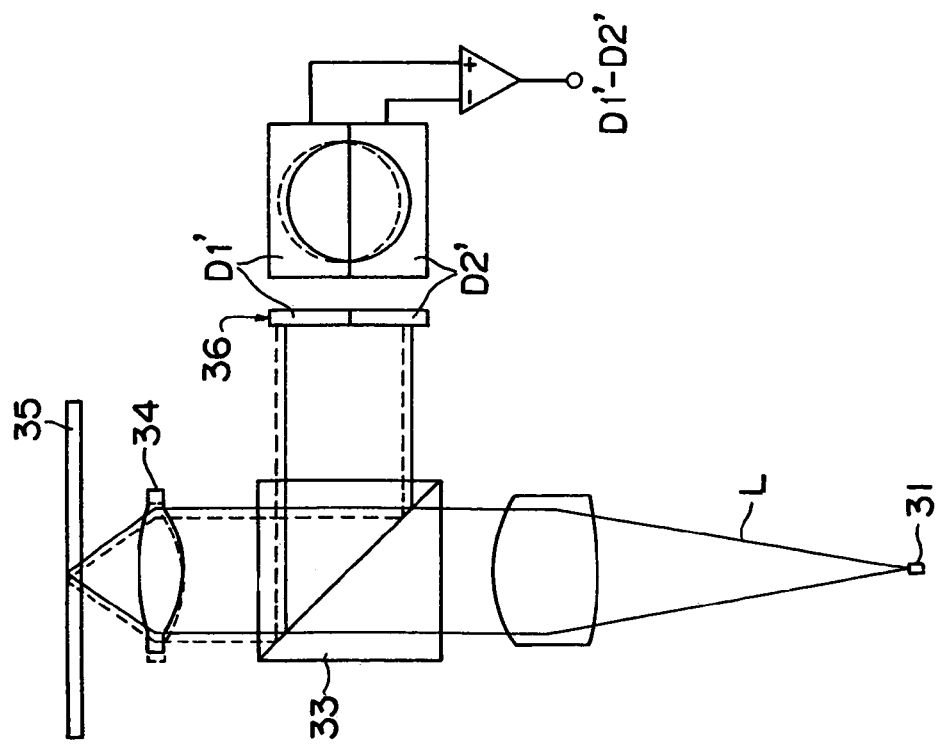

As shown in FIG. 31, the photodetector 219 has a light-receiving element 219a serving as the first light-receiving element, and light-receiving elements 219b, 219c serving as the second light-receiving element, which are disposed at both sides of the light-receiving element 219a.

The first hologram surface 121a has one kind of a region A41. Refracted light from the region A41 is split into three beams by the second hologram surface 121b. A main beam of the three beams is focused on the center of a light-receiving region M of the light-receiving element 219a. Sub-beams of the three beams are focused on light-receiving regions N1, N2 of the light-receiving elements 219b, 219c respectively disposed at both sides of the light-receiving element 219a.

The generation principle of the tracking error signal TES will be described below.

In the optical system, the push-pull signal PP can be generated by performing the computation of equation (82) above.

If the push-pull signal PP generated by performing the computation of equation (82) is the tracking error signal TES, then the offset will be generated owing to the OL shift, as described previously as a problem to be solved.

Thus the offset correction signal SHFT is generated by a method described below, and the TES signal not affected by the OL shift is generated by performing a computation of equation (83) shown below:

$$TES=PP-\gamma\times(SHFT) \quad (83)$$

The method of generating the offset correction signal SHFT will be described below.

Initially, regarding the setting of the diffraction efficiency of each of the first hologram surface 121a and the second hologram surface 121b, the first hologram surface 121a has a feature that its diffraction efficiency is entirely uniform, and the second hologram surface 21b has a feature that its diffraction efficiency changes gently according to the incidence position of light, as will be described below.

More specifically, the grating pitch P of the second hologram surface 121b is constant entirely but the DUTY, which is the ratio between a width L of a ridge portion and a width G of a valley portion, changes gently from a lower side of the sheet of paper of FIG. 31 toward an upper side thereof so that the spot of the zero-order diffracted light incident on the light-receiving region M from the second hologram surface 121b has an intensity distribution that becomes gradually brighter toward the upper end thereof in FIG. 31 and that the spots of the ±first-order diffracted lights incident on the light-receiving regions N1, N2 from the second hologram surface 121b have respective intensity distributions that become gradually darker toward the upper end thereof in FIG. 31. Alternatively, the grating pitch P and the DUTY of the second hologram surface may be constant, but the groove depth may be changed gently from the lower position toward the upper position in FIG. 31.

At this time, if the objective lens 4 shifts to the rear side of the drawing sheet of FIG. 30, the beam spot on the second hologram surface 121b also shifts to the upper side thereof as viewed in FIG. 31. In this case, the intensity distribution of the spot of the zero-order diffracted light incident on the light-receiving region M becomes bright as a whole, whereas the intensity distributions of the spots of the ±first-order diffracted lights incident on the light-receiving regions N1, N2 become dark as a whole. Conversely, if the objective lens 4 shifts to the front side of the drawing sheet of FIG. 31, the beam spot on the second hologram surface 121b shifts to the lower side thereof as viewed in FIG. 31. Then, the intensity distribution of the spot of the zero-order diffracted light incident on the light-receiving region M becomes dark as a whole, whereas the intensity distributions of the spots of the ±first-order diffracted lights incident on the light-receiving regions N1, N2 become bright as a whole.

Therefore, if a gain α is adjusted such that, let outputs of the light-receiving regions M, N1, and N2 be $O_M$, $O_{N1}$, and $O_{N2}$ respectively, SHFT=$O_M$−α($O_{N1}$+$O_{N2}$)=° in the state where there is no OL shift, then SHFT>0 when there is an OL shift toward the rear side of the drawing sheet of FIG. 30, and SHFT<0 when there is an OL shift toward the front side of the drawing sheet of FIG. 30.

That is, the offset correction signal SHFT becomes an offset signal that changes according to the direction and amount of the OL shift.

The optical disk 5 in each of the above-described embodiments generally means an optical disk information-recordable and/or information-reproducible by using light, such as a reproduction-only pit disk, an erasable and recordable phase change disk, a magneto-optical disk, a recordable disk, and so on. A rewritable disk in which recorded information is altered by using light is also an optical disk.

For example, if the optical disk 5 is a mass-produced pit disk (for reproduction only) that is considerably eccentric or wobbles, the objective lens 4 frequently shifts greatly when a servo-control is executed. But even in such a case, a tracking offset is prevented from occurring in the optical pickup device of each embodiment, and signals can be reproduced reliably.

If the optical disk 5 is a recordable disk, although a high optical power is required in a recording time, an optical pickup of one beam scheme is realized. Therefore, it is possible to utilize light efficiently, reduce a burden of the laser serving as the light source, and reduce power consumption.

What is claimed is:

1. A method of detecting a tracking error of an optical pickup in which light of a light source (1) is converged on a surface of an optical disk (5) by means of an objective lens (4) and light reflected from the optical disk (5) is used to detect a tracking error signal, comprising the steps of:
    making the light reflected from the optical disk (5) enter a first light-receiving element (13a, 19a–19c, 119a–119b, 219a, 319a) and a second light-receiving element (13b–13c, 13d–13e, 13f–13g, 16, 17 (FIG. 15), 103, 119c–119d, 219b–219c, 319b–319c) in such a manner that an amount of light entering the first light-receiving element is increased and an amount of light entering the second light-receiving element is decreased in accordance with a shift of the objective lens in a specified disk radial direction by a light-amount distribution means (10, 14, 21, 101a–101b, 102, 110, 118); and
    obtaining a tracking error signal (TES) by correcting a push-pull signal (PP), based on a differential signal (SHFT) between an output signal of the first light-receiving element and an output signal of the second light-receiving element.

2. The method of detecting a tracking error of an optical pickup according to claim 1, wherein
    the first light-receiving element (13a, 19a–19c, 119a–119b, 319a) is a light-receiving element for generating the push-pull signal, and the second light-receiving element (13b–13c, 13d–13e, 13f–13g, 16, 17 (FIG. 15), 103, 119c–119d, 219b–219c, and 319b–319c) is a light-receiving element for generating a correction signal, and
    the step of obtaining a tracking error signal comprises detecting the tracking error signal by subtracting a signal of a differential output between the first light-receiving element and the light-receiving element from the push-pull signal.

3. The method of detecting a tracking error of an optical pickup according to claim 1, wherein the first light-receiving element (19a, 119a–119b) is a two-part light-receiving element divided by a parting line in a track direction.

4. The method of detecting a tracking error of an optical pickup according to claim 1, wherein the first light-receiving element (13a, 319a) is a four-part light-receiving element divided by a parting line in a track direction and also divided by a parting line in a radial direction.

5. The method of detecting a tracking error of an optical pickup according to claim 1, wherein the second light-receiving element (13d–13e, 103) is a two-part light-receiving element divided by a parting line in a track direction.

6. The method of detecting a tracking error of an optical pickup according to claim 1, wherein the second light-receiving element (13f–13g) is a four-part light-receiving element divided by a parting line in a track direction and also divided by a parting line in a radial direction.

7. An optical pickup device comprising:
    a converging optical system (2, 4) including an objective lens (4) converging light of a light source (1) on a surface of an optical disk (5);
    a first light-receiving element (13a, 19a–19c, 119a–119b, 219a, 319a) and a second light-receiving element (13b–13c, 13d–13e, 13f–13g, 16, 17 (FIG. 15), 103, 119c–119d, 219b–219c, 319b–319c); and
    a signal-generating optical system (3, 6, 8, 10, 11, 12, 14, 15, 18, 21, 33, 107, 110, 118) guiding light reflected from the optical disk to the first light-receiving element and the second light-receiving element,
    the signal-generating optical system having a light-amount distribution means (10, 14, 21, 110, 101a–101b, 102, 118) distributing an amount of the light reflected from the optical disk to the first light-receiving element and the second light-receiving element such that an amount of light entering the first light-receiving element is increased and an amount of light entering the second light-receiving element is decreased in accordance with a shift of the objective lens (4) in a specified disk radial direction,
    wherein a push-pull signal (PP) is corrected based on a differential signal (SHFT) between an output signal of the first light-receiving element and an output signal of the second light-receiving element.

8. The optical pickup device according to claim 7, wherein the first light-receiving element (13a, 19a–19c, 119a–119b, 319a) is a light-receiving element for generating the push-pull signal, and the second light-receiving element (13b–13c, 13d–13e, 13f–13g, 16, 17 (FIG. 15), 103, 119c–119d, 219b–219c, 319b–319c) is a light-receiving element for generating a correction signal.

9. An optical pickup device comprising:
    a converging optical system (2, 4) including an objective lens (4) converging light of a light source (1) on a surface of an optical disk (5);
    a signal-generating optical system (3, 6, 8, 10, 11, 12, 14, 15, 18, 21, 33, 107, 110, 118) guiding light reflected from the optical disk to detect a tracking error signal;

a first light-receiving element (13a, 19a–19c, 119a–119b, 319a) for generating a push-pull signal; and a second light-receiving element (13b–13c, 13d–13e, 13f–13g, 16, 17 (FIG. 15), 103, 119c–119d, 219b–219c, 319b–319c) for generating a correction signal, wherein in accordance with a shift of the objective lens (4) in a specified disk radial direction, light incident on the first light-receiving element shifts so that a signal output of the first light-receiving element increases, while light incident on the second light-receiving element shifts so that a signal output of the second light-receiving element decreases.

10. The optical pickup device according to claim 7, further comprising:

a third light-receiving element (9a–9b) for generating a signal of the optical disk;

a first polarization beam splitter (3) splitting the light reflected from the optical disk into two beams; and a second polarization beam splitter (6) splitting one of the two beams into a beam including the signal of the optical disk and a beam including the signal of the optical disk, guiding the beam including the signal to the third light-receiving element, and guiding the beam not including the signal to the first and second light-receiving elements via the light-amount distribution means (10, 14, 101a–101b, 102).

11. The optical pickup device according to claim 7, wherein the light-amount distribution means comprises a diffraction grating element (10, 110, 118) whose diffraction efficiency changes depending on an incidence position of incident light.

12. The optical pickup device according to claim 11, wherein the diffraction grating element (110) is divided into two regions (110a, 110b) by a parting line in a radial direction, and diffraction efficiencies of these two regions are opposite to each other in characteristics thereof along the parting line.

13. The optical pickup device according to claim 11, wherein the diffraction grating element (10, 110, 118) is a relief-type diffraction grating having ridge portions and groove portions, and diffraction efficiency of the diffraction grating element changes because a ratio between a ridge portion and a corresponding groove portion changes gradually from one end of the diffraction grating element toward the other end thereof.

14. The optical pickup device according to claim 11, wherein the diffraction grating element (10, 110, 118) is a relief-type diffraction grating having ridge portions and groove portions, and diffraction efficiency of the diffraction grating element changes because a depth of the groove portions changes gradually from one end of the diffraction grating element toward the other end thereof.

15. The optical pickup device according to claim 7, wherein the light-amount distribution means comprises a filter (101a–101c, 102) whose transmittance changes with a gradient for light incident on the first and second light-receiving elements.

16. The optical pickup device according to claim 10, wherein the light-amount distribution means comprises a half mirror (14) whose transmittance or reflectivity changes depending on an incidence position of incident light.

17. The optical pickup device according to claim 7, further comprising:

a polarization beam splitter (33) splitting the light reflected from the optical disk into two beams and guiding one of the two beams to the second light-receiving element; and a light-branching element (18) branching part of the other beam and guiding the branched part of light to the first light-receiving element, wherein a focus signal and a push-pull signal are generated by reception of the light at the first light-receiving element (19a–19c), and a signal of the optical disk is generated by reception of the light at the second light-receiving element (17).

18. The optical pickup device according to claim 17, wherein transmittance or reflectivity of the polarization beam splitter (33) changes for a light component not including the signal of the optical disk depending on an incidence position of incident light.

19. The optical pickup device according to claim 17, wherein the light-branching element is a hologram element divided into two regions by a parting line in a radial direction and one of the two regions is further divided into two regions by a parting line in a track direction so that the hologram element has three regions (A1, A2, A3) in total.

20. The optical pickup device according to claim 19, wherein the first light-receiving element consists of a two-part light-receiving element (19a) divided by a parting line in a radial direction and two other light-receiving elements (19b, 19c).

21. The optical pickup device according to claim 20, wherein a focus error signal is generated by reception of diffracted light from the other of the two regions of the light-branching element at a center of the two-part light-receiving element (19a); and a push-pull signal is generated by receiving diffracted light from each of two regions (A2, A3) corresponding to two quarters of the light-branching element at each of the light-receiving elements (19b, 19c).

22. The optical pickup device according to claim 21, wherein the two light-receiving elements (19b, 19c) are disposed to confront the diffracted lights from each of the two regions (A2, A3) corresponding to the two quarters of the light-branching element.

23. The optical pickup device according to claim 7, further comprising:

a third light-receiving element (20a, 20b) for generating a signal of the optical disk (5);

a polarization beam splitter (33) splitting light reflected from the optical disk into two beams; and a light splitting means (107) splitting one of the beams into a beam including the signal of the optical disk and a beam not including the signal.

24. The optical pickup device according to claim 7, further comprising:

a third light-receiving element for generating a signal of the optical disk, and a light-receiving element (117) for generating the push-pull signal;

a polarization beam splitter (33) splitting light reflected from the optical disk into a beam including the signal of the optical disk and a beam not including the signal and guiding the beam including the signal to the third light-receiving element and the light-receiving element (117) for generating the push-pull signal; and a light-branching element (121) branching part of the beam not including the signal and guiding the branched light to the first and second light-receiving elements (219a, 219b–219c).

25. The optical pickup device according to claim 24, wherein the light-branching element is a diffraction grating element (121 (121a)) diffracting light in a track direction;

the light-amount distribution means comprises a diffraction grating element (121 (121b)) whose diffraction efficiency changes depending on an incidence position of incident light;
light diffracted by the diffraction grating element enters the diffraction grating element; and
the correction signal is generated by receiving zero-order light and ±first-order light of the diffraction grating element at the first and second light-receiving elements (219a, 219b–219c).

26. The optical pickup device according to claim 7, further comprising:
a third light-receiving element (17) for generating a signal of the optical disk;
a polarization beam splitter (33) splitting the light reflected from the optical disk into a beam including the signal of the optical disk and a beam not including the signal and guiding the beam including the signal to the third light-receiving element (17); and
a light-branching element (118, 21) branching part of the light not including the signal and guiding the branched light to the first and second light-receiving elements (119a, 119b–119c, 319a, 319b–319c),
wherein a focus signal and the push-pull signal are generated by receiving the light at the first and second light-receiving elements.

27. The optical pickup device according to claim 26, wherein the light-branching element is a hologram element (118) divided into two regions by a parting line in a radial direction and each of the two regions is further divided into two regions by a parting line in a track direction so that the hologram element has four regions (A21, A22, A23, A24) in total; and
diffraction efficiencies of the two regions are opposite to each other in characteristics thereof along the parting line in the radial direction.

28. The optical pickup device according to claim 26, wherein the light-branching element is a hologram element divided into two regions by a parting line in a radial direction and one of the two regions is further divided into two regions by a parting line in a track direction so that the hologram element has three regions (A1, A2, A3) in total; and
diffraction efficiencies of the two regions are opposite to each other in characteristics thereof along the parting line in the radial direction.

29. The optical pickup device according to claim 26, wherein the light-amount distribution means is disposed between the light-branching element and the first and second light-receiving elements.

30. The optical pickup device according to claim 29, wherein the light-branching element is a hologram element (21 (21a)) divided into two regions (A31, A32) by a parting line in a track direction;
a focus signal and the push-pull signal are generated by receiving diffracted light from the two regions at the first and second light-receiving elements (319a, 319b–319c);
the light-amount distribution means comprises a diffraction grating element (21 (21b)) whose diffraction efficiency changes depending on an incidence position of incident light; and
the correction signal is generated by receiving first order light of the diffraction grating element at the second light-receiving element (319b-3 19c).

31. The optical pickup device according to claim 10, wherein the first polarization beam splitter (3) or the polarization beam splitter (33) is disposed between the light source (1) and a collimating lens (2) converting light of the light source into parallel light.

32. The optical pickup device according to claim 7, wherein the optical disk (5) is a pit disk, a phase change disk, or a magneto-optical disk.

33. The tracking error detection method of an optical pickup according to claim 1, wherein the optical disk (5) is a pit disk, a phase change disk, or a magneto-optical disk.

34. The optical pickup device according to claim 23, wherein the light-amount distribution means and the light-branching element are formed on one substrate, with the light-amount distribution means formed on one surface of the substrate and with the light-branching element formed on the other surface thereof.

35. An optical disk apparatus having the optical pickup device according to claim 7.

36. The optical pickup device according to claim 17, wherein the first polarization beam splitter (3) or the polarization beam splitter (33) is disposed between the light source (1) and a collimating lens (2) converting light of the light source into parallel light.

37. The optical pickup device according to claim 23, wherein the first polarization beam splitter (3) or the polarization beam splitter (33) is disposed between the light source (1) and a collimating lens (2) converting light of the light source into parallel light.

38. The optical pickup device according to claim 24, wherein the first polarization beam splitter (3) or the polarization beam splitter (33) is disposed between the light source (1) and a collimating lens (2) converting light of the light source into parallel light.

39. The optical pickup device according to claim 26, wherein the first polarization beam splitter (3) or the polarization beam splitter (33) is disposed between the light source (1) and a collimating lens (2) converting light of the light source into parallel light.

40. The optical pickup device according to claim 9, wherein the optical disk (5) is a pit disk, a phase change disk, or a magneto-optical disk.

41. The optical pickup device according to claim 24, wherein the light-amount distribution means and the light-branching element are formed on one substrate, with the light-amount distribution means formed on one surface of the substrate and with the light-branching element formed on the other surface thereof.

42. The optical pickup device according to claim 26, wherein the light-amount distribution means and the light-branching element are formed on one substrate, with the light-amount distribution means formed on one surface of the substrate and with the light-branching element formed on the other surface thereof.

43. The optical pickup device according to claim 29, wherein the light-amount distribution means and the light-branching element are formed on one substrate, with the light-amount distribution means formed on one surface of the substrate and with the light-branching element formed on the other surface thereof.

44. An optical disk apparatus having the optical pickup device according to claim 9.

* * * * *

UNITED STATES PATENT AND TRADEMARK OFFICE
CERTIFICATE OF CORRECTION

PATENT NO. : 7,164,632 B2
APPLICATION NO. : 10/491546
DATED : January 16, 2007
INVENTOR(S) : Takahiro Miyake Page 1 of 1

It is certified that error appears in the above-identified patent and that said Letters Patent is hereby corrected as shown below:

On the title page insert:

Item --(30): Foreign Application Priority Data

October 4, 2001    (JP) ……………………….. 2001- 308590--

Signed and Sealed this

First Day of April, 2008

JON W. DUDAS
*Director of the United States Patent and Trademark Office*